United States Patent
Araki

(10) Patent No.: US 11,245,733 B2
(45) Date of Patent: Feb. 8, 2022

(54) INFORMATION PROCESSING APPARATUS, INFORMATION PROCESSING SYSTEM, AND METHOD OF REMOTE INFORMATION SHARING

(71) Applicant: Shigeo Araki, Kanagawa (JP)

(72) Inventor: Shigeo Araki, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 16/433,392

(22) Filed: Jun. 6, 2019

(65) Prior Publication Data

US 2019/0387033 A1 Dec. 19, 2019

(30) Foreign Application Priority Data

Jun. 19, 2018 (JP) .............................. JP2018-116521

(51) Int. Cl.
*H04L 29/06* (2006.01)
*G06F 3/14* (2006.01)
(Continued)

(52) U.S. Cl.
CPC ........ *H04L 65/4015* (2013.01); *G06F 3/1454* (2013.01); *H04L 47/801* (2013.01); *G06F 3/0482* (2013.01)

(58) Field of Classification Search
CPC . H04L 65/4015; H04L 65/4007; H04L 65/40; H04L 47/801; H04L 47/80;
(Continued)

(56) References Cited

U.S. PATENT DOCUMENTS

| 7,856,473 | B2 * | 12/2010 | Horikiri | ............ H04L 29/06027 709/204 |
| 8,218,829 | B2 * | 7/2012 | Kenoyer | ................. G06F 21/32 348/14.08 |

(Continued)

FOREIGN PATENT DOCUMENTS

| JP | 2006-005590 | 1/2006 |
| JP | 2017-091559 | 5/2017 |
| JP | 2017-130217 | 7/2017 |

OTHER PUBLICATIONS

Extended European Search Report for 19176870.4 dated Oct. 22, 2019.

*Primary Examiner* — Nam T Tran
(74) *Attorney, Agent, or Firm* — IPUSA, PLLC

(57) ABSTRACT

An information processing apparatus includes circuitry configured to acquire one or more pieces of resource information usable at the information processing apparatus in response to a selection of the one or more pieces of resource information by a user operation performed at the information processing apparatus; determine whether another information processing apparatus has at least one piece of resource information that matches any one of the one or more pieces of resource information acquired for the information processing apparatus; present to the user the another information processing apparatus, having the at least one piece of resource information that matches any one of the one or more pieces of resource information acquired for the information processing apparatus, as a remotely-located connectable apparatus; and perform a remote information sharing between the information processing apparatus and the another information processing apparatus using the acquired one or more pieces of resource information.

9 Claims, 21 Drawing Sheets

(51) Int. Cl.
  *H04L 12/927* (2013.01)
  *G06F 3/0482* (2013.01)
(58) Field of Classification Search
  CPC ........ G06F 3/1454; G06F 3/14; G06F 3/0482;
       G06F 3/0481; G06F 3/048; G06F 15/16;
       H04N 7/15
  See application file for complete search history.

(56) References Cited

U.S. PATENT DOCUMENTS

| | | | |
|---|---|---|---|
| 9,398,059 B2* | 7/2016 | Shepherd | H04L 65/403 |
| 9,846,526 B2* | 12/2017 | Lemus | H04L 65/4015 |
| 2003/0065722 A1* | 4/2003 | Ieperen | G06Q 10/109 |
| | | | 709/205 |
| 2004/0128354 A1 | 7/2004 | Horikiri et al. | |
| 2007/0198637 A1* | 8/2007 | Deboy | H04L 65/4015 |
| | | | 709/204 |
| 2009/0222741 A1* | 9/2009 | Shaw | G06Q 10/109 |
| | | | 715/753 |
| 2009/0268009 A1* | 10/2009 | Oya | H04L 65/403 |
| | | | 348/14.09 |
| 2010/0238494 A1 | 9/2010 | Araki | |
| 2010/0318984 A1 | 12/2010 | Araki | |
| 2011/0058205 A1 | 3/2011 | Araki | |
| 2011/0154192 A1* | 6/2011 | Yang | G06F 40/197 |
| | | | 715/256 |
| 2013/0063746 A1 | 3/2013 | Araki | |
| 2013/0235146 A1* | 9/2013 | Schaefer | H04L 12/1818 |
| | | | 348/14.08 |
| 2014/0204421 A1 | 7/2014 | Araki | |
| 2015/0220480 A1 | 8/2015 | Mihara et al. | |
| 2017/0160995 A1 | 6/2017 | Fukasawa et al. | |
| 2018/0018636 A1* | 1/2018 | Bisti | H04L 65/4015 |
| 2018/0067700 A1 | 3/2018 | Araki | |
| 2018/0121084 A1* | 5/2018 | Sakamoto | G06F 3/0416 |
| 2019/0020770 A1 | 1/2019 | Araki | |
| 2019/0129669 A1 | 5/2019 | Takahashi et al. | |

* cited by examiner

FIG. 5

SERVICE ACCOUNT INFORMATION

| USER ID | NAME | MAIL ADDRESS |
|---|---|---|
| a01 | Mary | a01@example.com |
| a02 | Sato | a02@example.com |
| ... | ... | ... |

FIG. 6

CONFERENCE SCHEDULE INFORMATION

| SCHEDULE NAME | OWNER USER | SCHEDULED TIME AND PERIOD | EXPECTED PARTICIPANT LIST | ATTACHMENT FILE |
|---|---|---|---|---|
| Meeting01 | a01,b02 | 2010-04-05 10:00-12:00 | a01,a02 | a01.doc |
| ... | ... | ... | ... | ... |

FIG. 7

STORAGE INFORMATION

| OWNER USER | TYPE | NAME |
|---|---|---|
| a02 | FILE | a02.doc |
| a02 | FOLDER | /WeeklyMeeting |

FIG. 8

SHARED SITE INFORMATION

| SITE NAME | SITE URL | USER | TYPE | FILE OR FOLDER URL | NAME |
|---|---|---|---|---|---|
| A-Group-Site | http://tenant001.office.example.com/A-Group-Site/ | a01,a02 | FILE | http://tenant001.office.example.com/A-Group-Site/a-shared01.doc | a-shared01.doc |
| | | | FOLDER | http://tenant001.office.example.com/A-Group-Site/DailyMeeting/ | /DailyMeeting |
| B-Group-Site | http://tenant002.office.example.com/B-Group-Site/ | b01,b02 | FOLDER | http://tenant002.office.example.com/B-Group-Site/WeeklyMeeting/ | /WeeklyMeeting |

FIG. 9

USER INFORMATION LIST

| USER ID | NAME | SETTING INFORMATION | SERVICE INFORMATION | IDENTIFICATION INFORMATION |
|---|---|---|---|---|
| user001 | Mary Smith | setting1 | service11,service12 | ICCARD-123 |
| user002 | Sato Suzuki | setting2 | service21,service22 | ICCARD-248 |
| user003 | Alice Liddell | setting3 | service3 | ICCARD-390 |
| ... | ... | ... | ... | ... |

FIG. 10

SERVICE INFORMATION LIST

| SERVICE INFORMATION | USER ID | ADDRESS INFORMATION | USER ID OF EXTERNAL SERVICE | AUTHENTICATION TOKEN OF EXTERNAL SERVICE |
|---|---|---|---|---|
| service11 | user001 | office.example.com | a01 | eyJhbGc11... |
| service12 | user001 | suite.example.com | b01 | eyJhbGc12... |
| service21 | user002 | office.example.com | a02 | eyJhbGc21... |
| service22 | user002 | suite.example.com | b02 | eyJhbGc22... |
| service3 | user003 | alice@example.com | | |
| ... | ... | ... | ... | ... |

FIG. 11

APPARATUS MANAGEMENT INFORMATION

| APPARATUS IP ADDRESS | SCHEDULE NAME | FILE NAME | STORAGE FOLDER | WEB PAGE (URL) | SHARED SITE INFORMATION |
|---|---|---|---|---|---|
| 192.168.0.2 | Meeting01 | | /DailyMeeting | | A-Group-Site |
| 192.168.0.3 | | | | http://tenant002.office.example.com/B-Group-Site/ | B-Group-Site |
| 192.168.0.4 | Meeting01 | | | | |
| ... | ... | ... | ... | ... | ... |

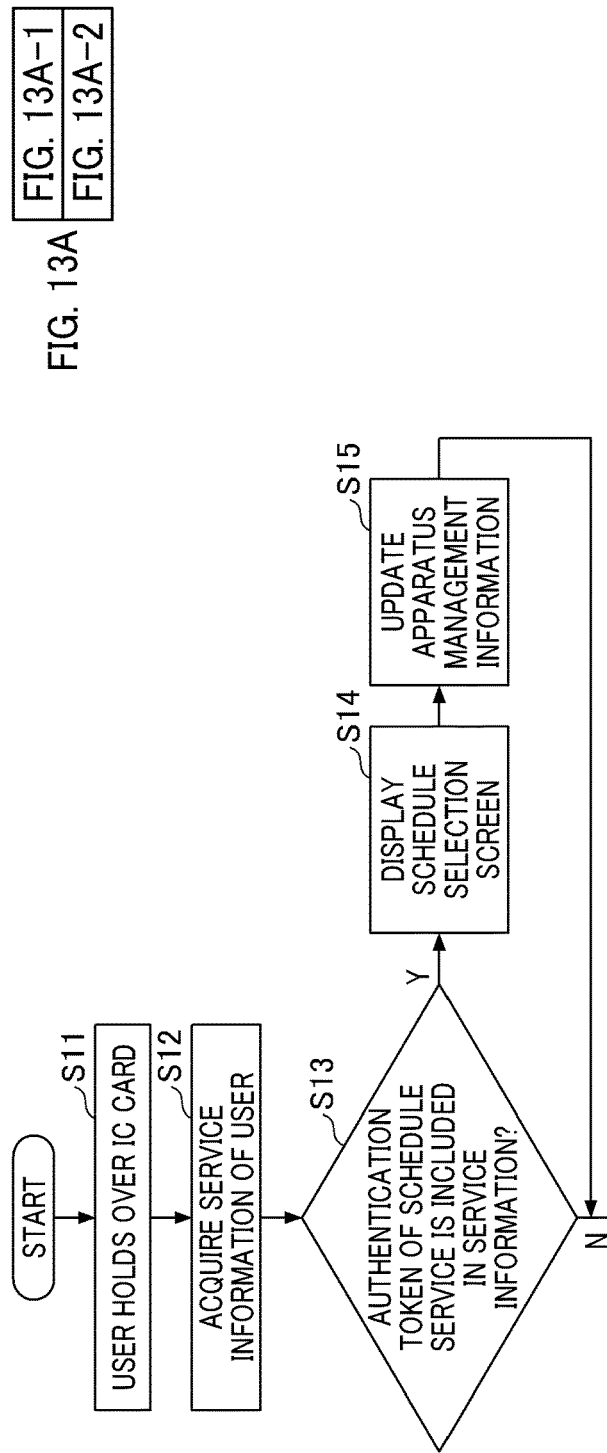

FIG. 14

| SERVICE INFORMATION | USER ID | ADDRESS INFORMATION | USER ID OF EXTERNAL SERVICE | AUTHENTICATION TOKEN OF EXTERNAL SERVICE |
|---|---|---|---|---|
| service11 | user001 | office.example.com | a01 | eyJhbGc11··· |
| service12 | user001 | suite.example.com | b01 | eyJhbGc12··· |

FIG. 15

SCHEDULE SELECTION SCREEN

| SELECTION | SCHEDULE NAME | SCHEDULED TIME AND PERIOD | EXPECTED PARTICIPANT LIST |
|---|---|---|---|
| ☑ | Meeting01 | 2010-04-05 10:00-12:00 | a01,a02 |
| ☐ | Meeting02 | 2010-04-05 15:00-16:00 | a01,b01 |

FILE SELECTION SCREEN

- 📁 REFERENCE MATERIAL
- 📁 DATA
- PRESENTATION 1.ppt
- PRESENTATION 2.ppt
- PRESENTATION 3.ppt

CONNECTION DESTINATION SELECTION SCREEN 1600

| SELECTION | APPARATUS IP ADDRESS | SCHEDULE NAME | FILE NAME | STORAGE FOLDER | WEB PAGE (URL) | SHARED SITE INFORMATION |
|---|---|---|---|---|---|---|
| ☑ | 192.168.0.2 | Meeting01 | | /DailyMeeting | | A-Group-Site |
| ☑ | 192.168.0.4 | Meeting01 | | | http://tenant002.office.example.com/B-Group-Site/ | |
| ☐ | 192.168.0.3 | | | | | |

OK

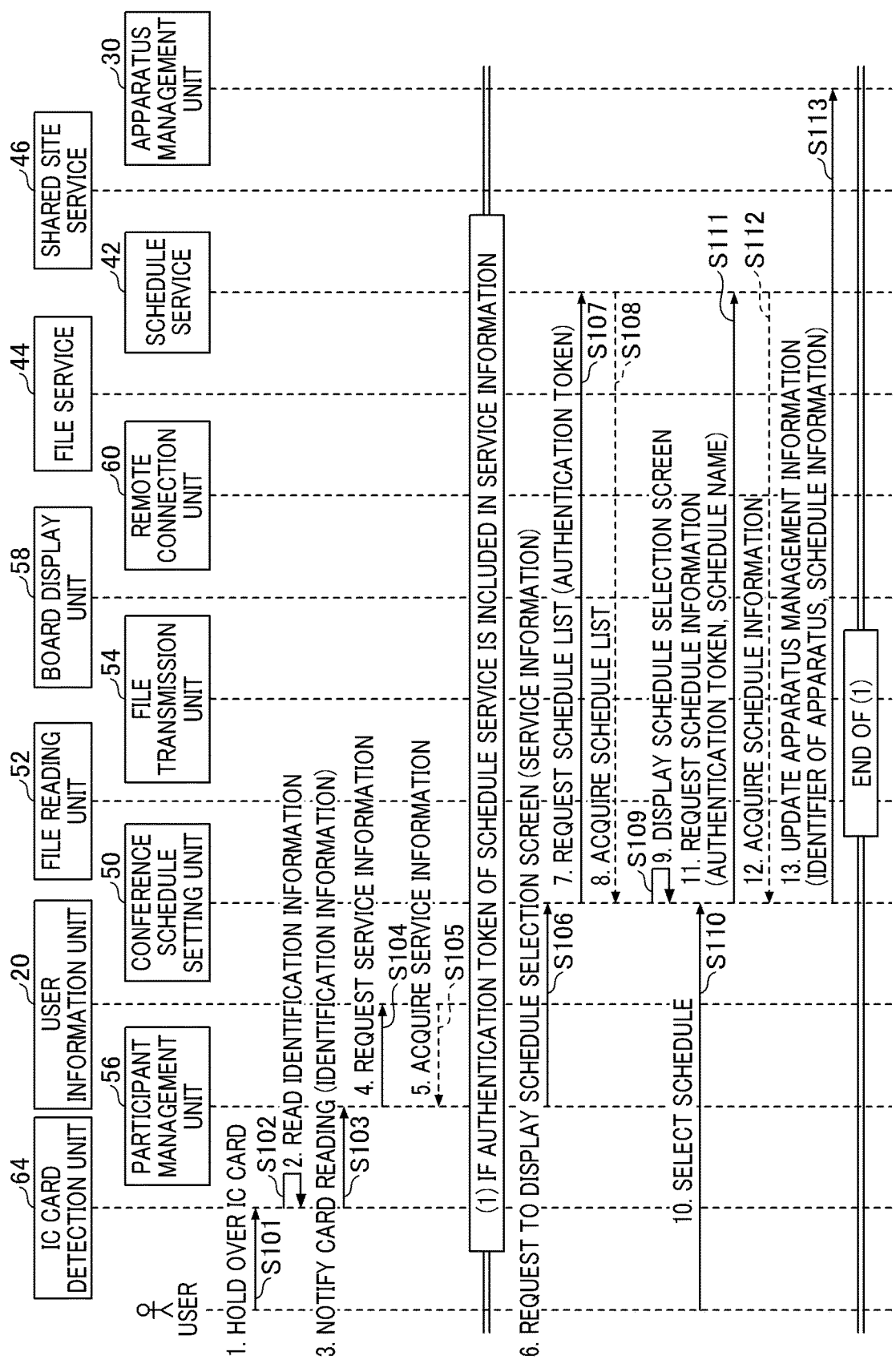

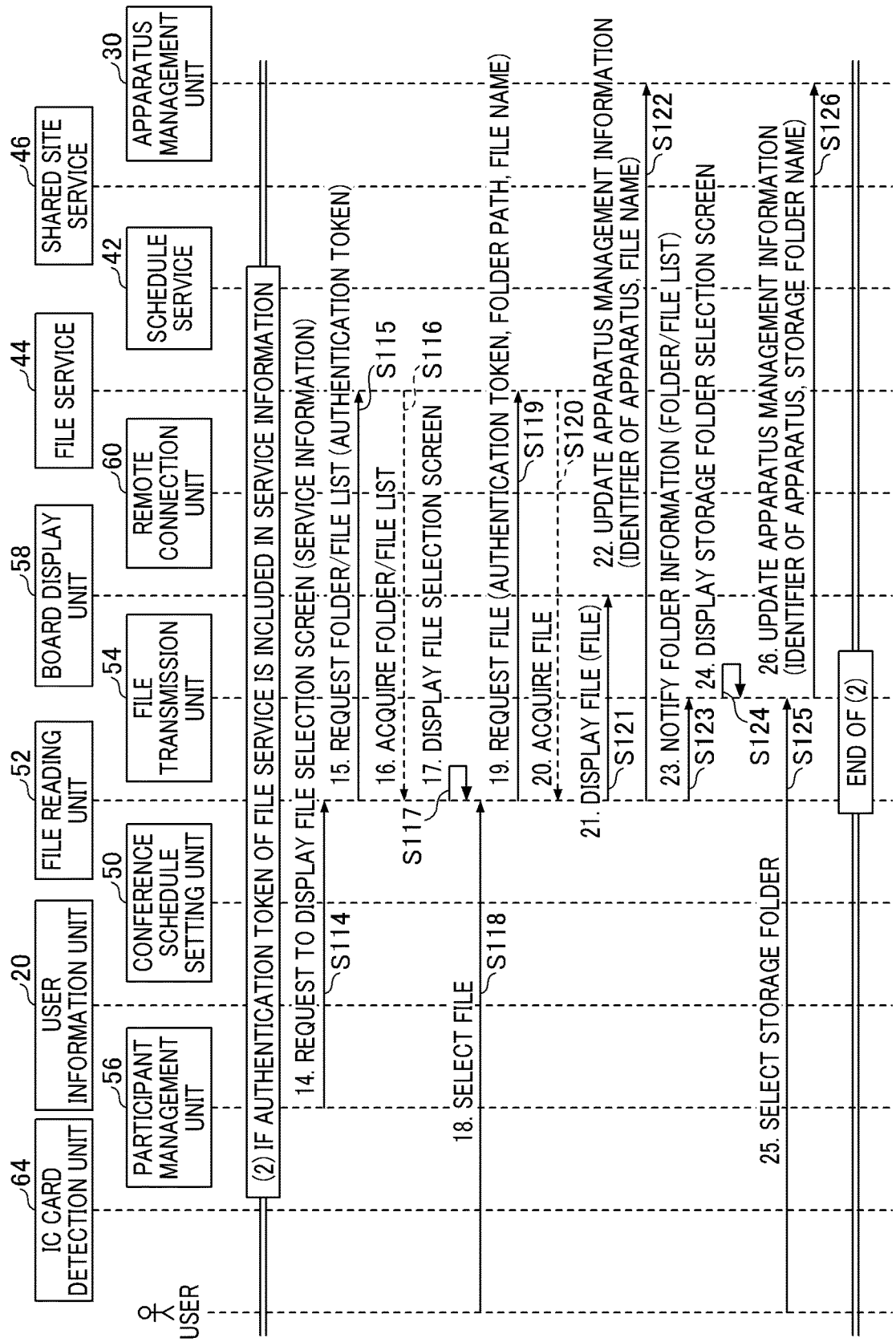

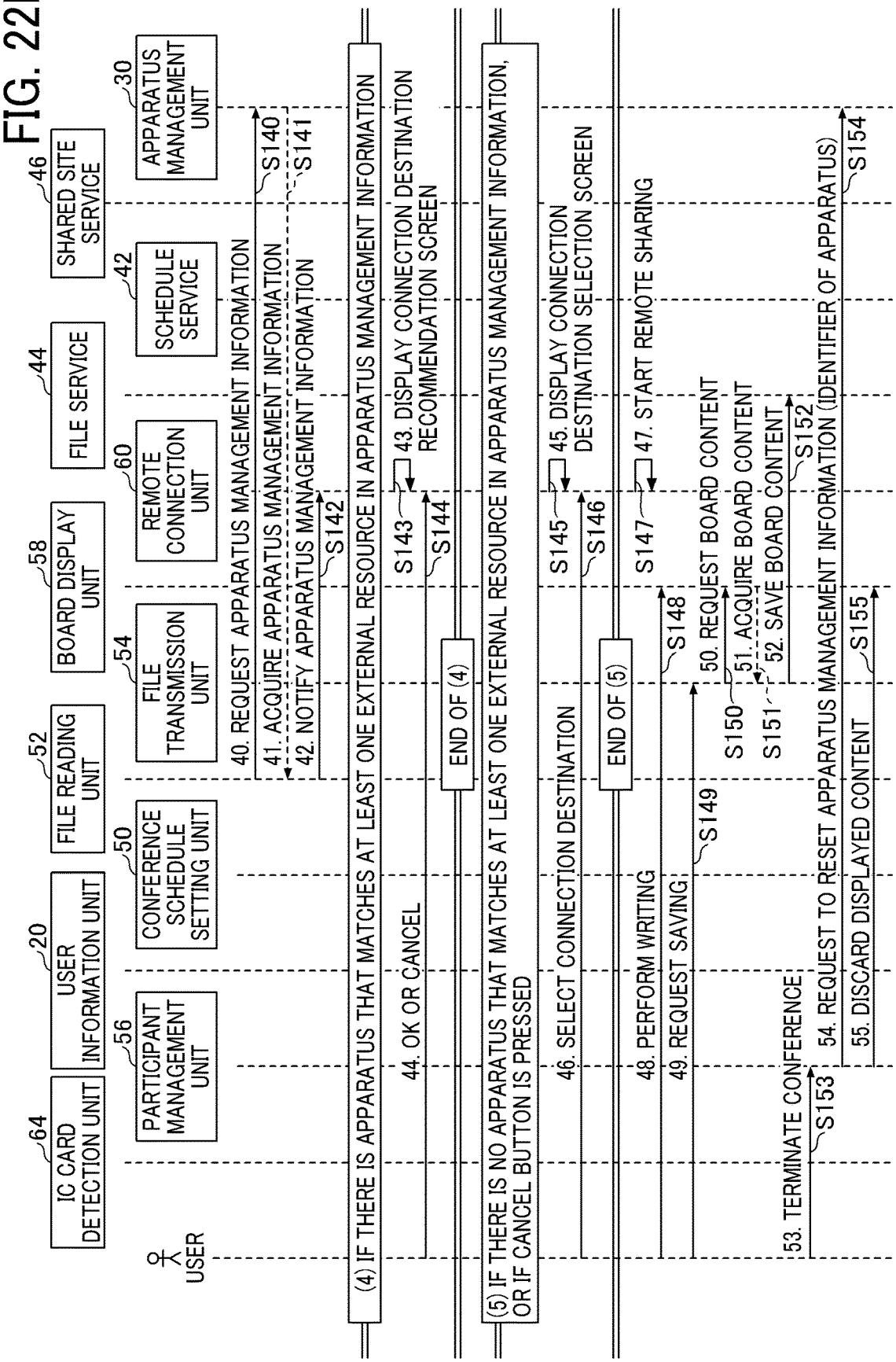

INFORMATION PROCESSING APPARATUS, INFORMATION PROCESSING SYSTEM, AND METHOD OF REMOTE INFORMATION SHARING

CROSS-REFERENCE TO RELATED APPLICATION

This application claims priority pursuant to 35 U.S.C. § 119(a) to Japanese Patent Application No. 2018-116521, filed on Jun. 19, 2018 in the Japan Patent Office, the disclosure of which is incorporated by reference herein in its entirety.

BACKGROUND

Technical Field

This disclosure relates to an information processing apparatus, an information processing system, and a method of remote information sharing.

Background Art

Conventionally, electronic information board apparatuses can share board content, camera-captured images and microphone-received audio (e.g., voices) with another electronic information board apparatuses, personal computers (PCs) or and the like at remote sites.

For example, teleconferencing systems that connect multiple sites to implement collaboration works between remote sites are known. One example of teleconferencing systems is a video conferencing system. The video conference system typically includes an input/output apparatus of image and audio (e.g., camera, microphone, monitor, speaker), an encoding and decoding apparatus of image and audio, and a communication apparatus and a line used for connecting multiple sites. Further, to share data between conference rooms at remote sites, an electronic blackboard is disposed in each one of conference rooms, in which writing on one electronic blackboard can be shared and applications can be operated by the electronic blackboards at remote sites.

SUMMARY

As one aspect of the present invention, an information processing apparatus is devised. The information processing apparatus includes circuitry configured to acquire one or more pieces of resource information usable at the information processing apparatus in response to a selection of the one or more pieces of resource information by a user operation performed at the information processing apparatus; determine whether another information processing apparatus has at least one piece of resource information that matches any one of the one or more pieces of resource information acquired for the information processing apparatus; present to the user the another information processing apparatus, having the at least one piece of resource information that matches any one of the one or more pieces of resource information acquired for the information processing apparatus, as a remotely-located connectable apparatus; and perform a remote information sharing between the information processing apparatus and the another information processing apparatus using the acquired one or more pieces of resource information.

As another aspect of the present invention, an information processing system including a plurality of information processing apparatuses each respectively located at each remote location is devised. The information processing system includes circuitry configured to store identification information identifying each one of the information processing apparatuses and one or more pieces of resource information usable at each one of the information processing apparatuses in association with each other in a memory as apparatus management information of the plurality of information processing apparatuses; acquire the one or more pieces of resource information usable at each one of the information processing apparatuses in response to a selection of the one or more pieces of resource information by a user operation performed at each one of the information processing apparatus; determine, among the plurality of information processing apparatus, whether a second information processing apparatus has at least one piece of resource information that matches any one of the one or more pieces of resource information acquired for a first information processing apparatus; present to the user the second information processing apparatus, having the at least one piece of resource information that matches any one of the one or more pieces of resource information acquired for the first information processing apparatus, as a remotely-located connectable apparatus; and perform a remote information sharing between the first information processing apparatus and the second information processing apparatus using the acquired one or more pieces of resource information.

As another aspect of the present invention, a method of sharing information between a plurality of information processing apparatuses each respectively located at each remote location is devised. The method includes acquiring one or more pieces of resource information usable at each one of the information processing apparatuses in response to a selection of the one or more pieces of resource information by a user operation performed at each one of the information processing apparatus; determining, among the plurality of information processing apparatus, whether a second information processing apparatus has at least one piece of resource information that matches any one of the one or more pieces of resource information acquired for a first information processing apparatus; presenting to the user the second information processing apparatus, having the at least one piece of resource information that matches any one of the one or more pieces of resource information acquired for the first information processing apparatus, as a remotely-located connectable apparatus; and performing a remote information sharing between the first information processing apparatus and the second information processing apparatus using the acquired one or more pieces of resource information.

BRIEF DESCRIPTION OF THE DRAWINGS

A more complete appreciation of the description and many of the attendant advantages and features thereof can be readily acquired and understood from the following detailed description with reference to the accompanying drawings, wherein:

FIG. 5 is an example of a configuration of service account information;

FIG. 6 is an example of a configuration of conference schedule information;

FIG. 7 is an example of a configuration of storage information;

FIG. 8 is an example of a configuration of shared site information;

FIG. 9 is an example of a configuration of a user information list;

FIG. 10 is an example of a configuration of a service information list;

FIG. 11 is an example of a configuration of apparatus management information;

FIGS. 13A-1 and 13A-2 (FIG. 13A) are an example of flowchart illustrating the steps of processing in the information processing system according to the embodiment;

FIG. 14 is an example of a configuration of service information identified from acquired identification information;

FIG. 15 is an example of a schedule selection screen;

FIG. 16 is an example of a file selection screen;

FIG. 21 is an example of a connection destination selection screen; and

FIGS. 22A, 22B, 22C and 22D are examples of sequence diagrams describing processing in the information processing system according to the embodiment.

The accompanying drawings are intended to depict embodiments of the present invention and should not be interpreted to limit the scope thereof. The accompanying drawings are not to be considered as drawn to scale unless explicitly noted.

DETAILED DESCRIPTION

A description is now given of exemplary embodiments of the present inventions. It should be noted that although such terms as first, second, etc. may be used herein to describe various elements, components, regions, layers and/or units, it should be understood that such elements, components, regions, layers and/or units are not limited thereby because such terms are relative, that is, used only to distinguish one element, component, region, layer or unit from another region, layer or unit. Thus, for example, a first element, component, region, layer or unit discussed below could be termed a second element, component, region, layer or unit without departing from the teachings of the present inventions.

In addition, it should be noted that the terminology used herein is for the purpose of describing particular embodiments only and is not intended to be limiting of the present inventions. Thus, for example, as used herein, the singular forms "a", "an" and "the" are intended to include the plural forms as well, unless the context clearly indicates otherwise. Moreover, the terms "include" and/or "including," when used in this specification, specify the presence of stated features, integers, steps, operations, elements, and/or components, but do not preclude the presence or addition of one or more other features, integers, steps, operations, elements, components, and/or groups thereof.

Hereinafter, a description is given of one or more embodiments of the present invention with reference to the drawings. In the embodiment, an electronic information board apparatus is described as an example of information processing apparatus that performs remote information sharing, but the information processing apparatus is not limited to the electronic information board apparatus. For example, a personal computer (PC) can be used as the information processing apparatus in the embodiment.

Figure 1:
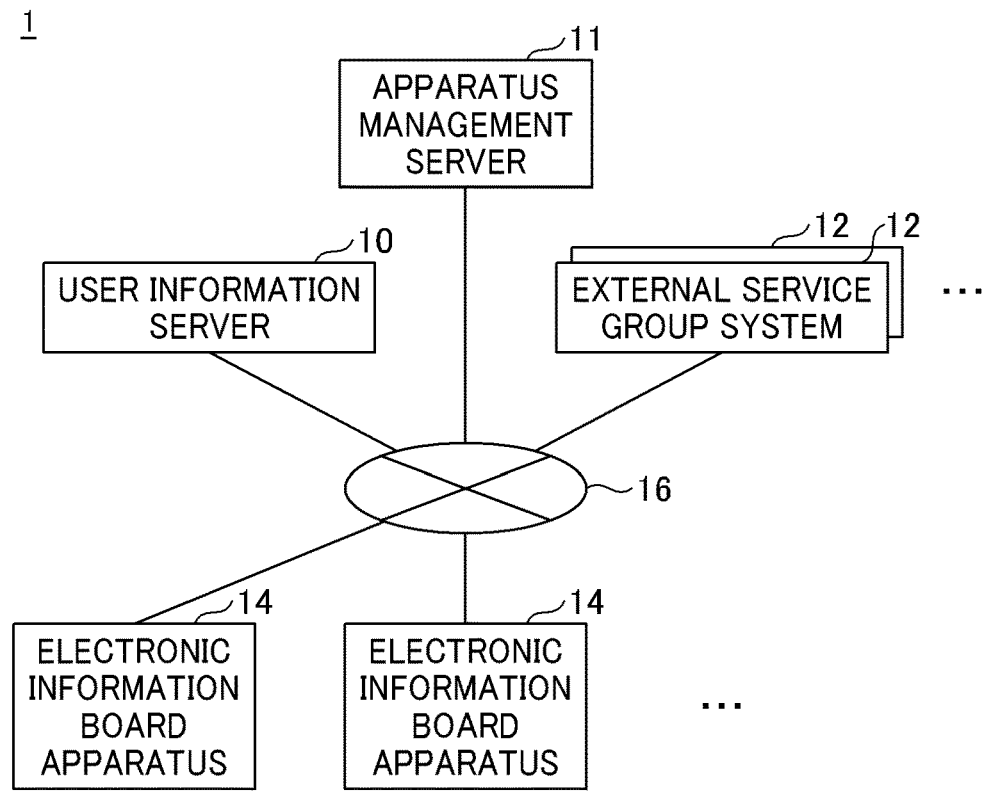
FIG. 1 is an example of a schematic configuration of an information processing system according to an embodiment of the present invention.

System Configuration:

FIG. 1 is an example of a schematic configuration of an information processing system 1 according to an embodiment of the present invention. As illustrated in FIG. 1, the information processing system 1 includes, for example, a user information server 10, an apparatus management server 11 (apparatus control server), a plurality of external service group systems 12, and a plurality of electronic information board apparatuses 14, which are communicatively connected to each other via a network 16, such as the Internet or local area network (LAN). The user information server 10, the apparatus management server 11 and the electronic information board apparatus 14 can collectively configure an electronic information board system. The user information server 10, the apparatus management server 11 and the electronic information board apparatus 14 can operate in cooperation with the external service group system 12 disposed outside the electronic information board system, to provide one or more functions related to the electronic information board apparatus 14. In this description, the terms of "management" and "control" are interchangeably used.

The external service group provided by the external service group system 12 is referred to as a groupware, and each service belonging to the same external service group can be used by using the same authentication information, such as a combination of identification (ID) and password, access token, or the like.

For example, the external service group indicates an integrated service, such as Office 365 (registered trademark), which includes various services, such as a user service, a storage service, a schedule service, a shared site service, and the like. The external service group is provided in such a manner that services such as user service, storage service, schedule service, and shared site service are available for use by the same user account.

Each of the plurality of external service group systems 12 can be provided by, for example, different vendors or companies. Therefore, for example, it can be assumed that one user may use one external service group system of Company A and another external service group system of Company B. The different vendors or companies are one example. For example, the same vendor or company can provide multiple external service group systems. Further, the external service group system 12 can be implemented by one or more computers.

The user information server 10 stores a user information list and the like to be described later, and the user information server 10 is used with the electronic information board apparatus 14. The user information server 10 can be shared by a plurality of the electronic information board apparatuses 14, and the user information server 10 may not be on the same network segment of the electronic information board apparatus 14. Further, the user information server 10 can be disposed inside the electronic information board apparatus 14. Further, the user information server 10 can be implemented by one or more computers.

The apparatus management server 11 stores apparatus management information (apparatus control information) and the like to be described later, and the apparatus management server 11 is used with the electronic information board apparatus 14. Further, the apparatus management server 11 can be implemented by one or more computers. Although the configuration in FIG. 1 illustrates an example of configuration that the user information server 10 and the apparatus management server 11 are separated as different servers, the user information server 10 and the apparatus management server 11 can be implemented by one server.

The electronic information board apparatus 14 displays images drawn by, for example, an electronic pen and/or a hand. Further, the electronic information board apparatus 14 can also display images of electronic files read from a universal serial bus (USB) memory, a personal computer (PC) connected via a cable, or the external service group system 12. Further, the electronic information board apparatus 14 has a function of sharing data (e.g., image data) displayed on the electronic information board apparatus 14 with another electronic information board apparatus 14 located at a remote connection destination, which is referred to as the remote information sharing in this description. In this description, if one electronic information board apparatus 14 is located at one location and another electronic information board apparatus is located at another location different from the one location, the one location and another location are remote locations with each other, and if one electronic information board apparatus 14 and another electronic information board apparatus 14 can be connected with each other, each of the one electronic information board apparatus 14 and another electronic information board apparatus 14 can be used as a remotely-located connectable apparatus. When the remote information sharing is performed, one electronic information board apparatus 14 shares information, such as contents written and/or displayed on a board, camera-captured images and microphone-received audio, or the like with another electronic information board apparatus 14. Further, the electronic information board apparatus 14 is provided with an authentication function to authenticate a user, such as authentication using an integrated circuit (IC) card and facial recognition.

The electronic information board apparatus 14 is an example of information processing apparatuses, such as any information processing apparatuses having a function of the remote information sharing, such as a remote conference system, a display, a projector, or the like. It should be noted that the remote information sharing function of the information processing apparatus can use any methods, such as apparatuses and devices that can transmit and receive data with each other directly or transmit and receive data with each other via an intermediary server. The configuration of the information processing system 1 in FIG. 1 is just one example. For example, at least a part of the functions of the user information server 10, the apparatus management server 11, and the external service group system 12 can be provided in the electronic information board apparatus 14.

Further, the information processing system 1 can be configured such that at least a part of the functions of the user information server 10, the apparatus management server 11, the external service group system 12 and the electronic information board apparatus 14 is implemented by another information processing apparatus other than the user information server 10, the apparatus management server 11, the external service group system 12 and the electronic information board apparatus 14.

Figure 2:
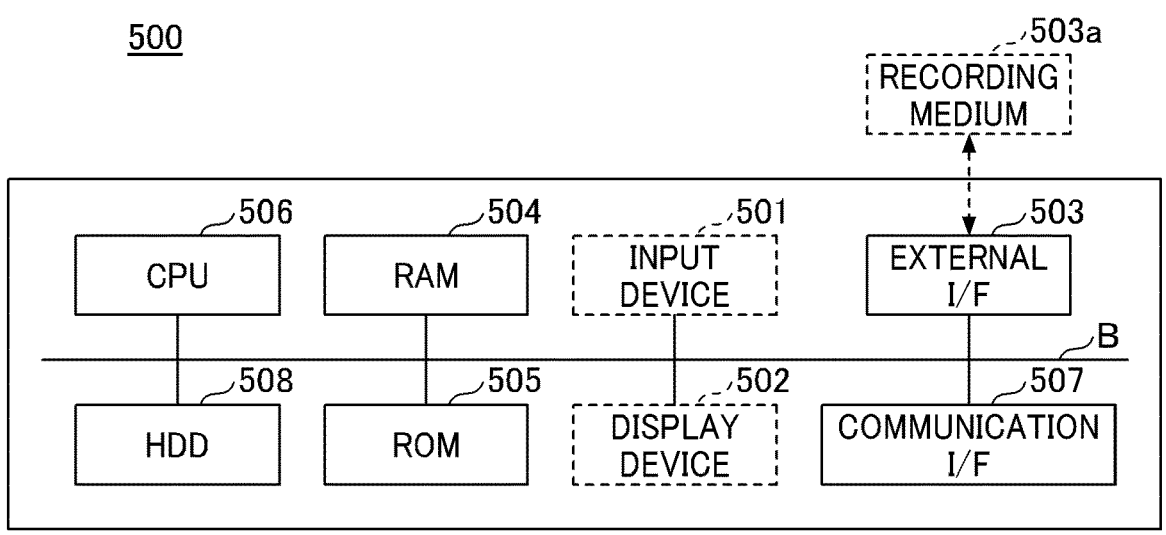
FIG. 2 is an example of a hardware block diagram of a computer.

Hardware Configuration:

Computer:

The user information server 10, the apparatus management server 11 and the external service group system 12 illustrated in FIG. 1 can be implemented, for example, by a computer having a hardware configuration illustrated in FIG. 2. FIG. 2 is an example of a hardware block diagram of a computer 500.

As illustrated in FIG. 2, the computer 500 includes, for example, an input device 501, a display device 502, an external interface (I/F) 503, a random-access memory (RAM) 504, a read only memory (ROM) 505, a central processing unit (CPU) 506, a communication interface (I/F) 507 and a hard disk drive (HDD) 508 connected to one another by bus B. The input device 501 and the display device 502 may be connected when necessary.

The input device 501 includes, for example, a keyboard, a mouse, a touch panel and the like, and is used by a user to input each of the operation signals. The display device 502 includes, for example, a display to display results of processing by the computer 500.

The communication I/F 507 is an interface that connects the computer 500 to various networks. Thus, the computer 500 can communicate data via the communication I/F 507.

Further, the HDD 508 is an example of a non-volatile storage device storing programs and data. The stored programs and data include operating system (OS), which is a basic software controlling the computer 500 entirely, and one or more applications that provide various functions on the OS. Further, the computer 500 can use a drive device, such as a solid-state drive (SSD) that uses a flash memory as a storage medium, instead of the HDD 508.

The external I/F 503 is an interface with an external device. The external device includes, for example, a recording medium 503a and the like. Thus, the computer 500 can read and/or write data with the recording medium 503a via the external I/F 503. The recording medium 503a includes, for example, a flexible disk, a compact disk (CD), a digital versatile disk (DVD), a secure digital (SD) memory card, a USB memory, a subscriber identity module (SIM) card, and the like.

The ROM 505 is an example of a non-volatile semiconductor memory (storage device) capable of retaining programs and data even when power supply is turned off. The ROM 505 stores programs and data such as basic input/operating system (BIOS), OS settings, and network settings to be executed at the time of activating the computer 500. The RAM 504 is an example of a volatile semiconductor memory (storage device) that temporarily retains programs and data.

The CPU 506 is a computing device that reads programs and data from a storage device, such as the ROM 505 and the HDD 508, onto the RAM 504, and performs processing to control and implement functions of the computer 500 entirely. The CPU 506 can be implemented by one processor or a plurality of processors.

The user information server 10, the apparatus management server 11 and the external service group system 12 can implement various processes to be described later using, for example, the hardware configuration of the computer 500 illustrated in FIG. 2.

Figure 3:
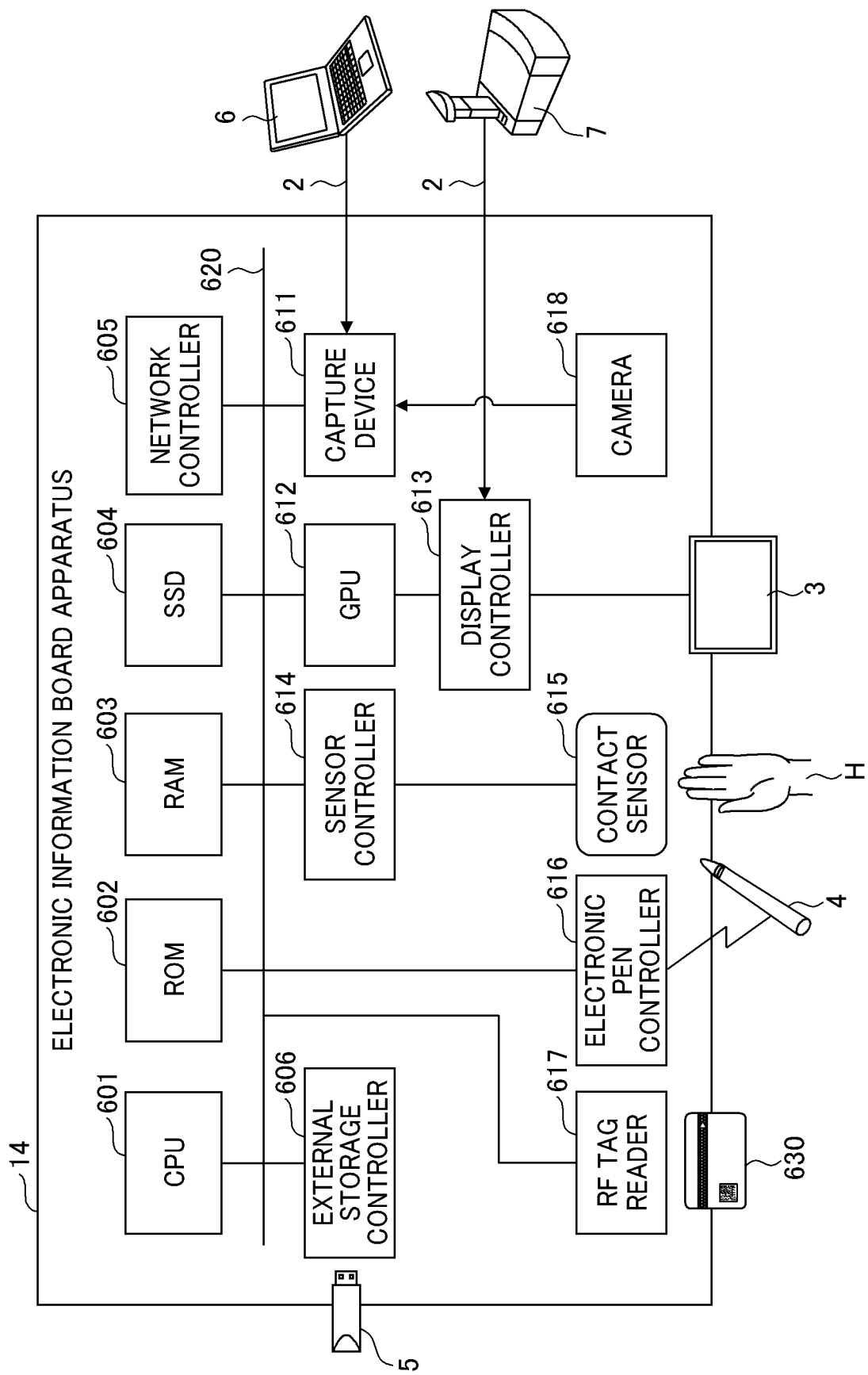
FIG. 3 is an example of a hardware block diagram of an electronic information board apparatus.

Electronic Information Board Apparatus:

FIG. 3 illustrates an example of a hardware block diagram of the electronic information board apparatus 14. As illustrated in FIG. 3, the electronic information board apparatus 14 includes, for example, a CPU 601, a ROM 602, a RAM 603, a solid-state drive (SSD) 604, a network controller 605, and an external storage controller 606.

The CPU 601 controls the operations of the electronic information board apparatus 14 entirely. The ROM 602 stores programs used for driving the CPU 601. The RAM 603 is used as a working memory of the CPU 601. The SSD 604 stores various data such as programs for the electronic information board apparatus 14. The network controller 605 controls communication with the network 16. The external storage controller 606 controls communication with a recording medium such as a USB memory 5.

Further, as illustrated in FIG. 3, the electronic information board apparatus 14 includes, for example, a capture device 611, a graphics processing unit (GPU) 612, a display controller 613, a sensor controller 614, a contact sensor 615, an electronic pen controller 616, a radio frequency (RF) tag reader 617, and a camera 618.

The capture device 611 captures image information from the PC 6 or the camera 618 as still image files or video image files. The GPU 612 performs graphics processing. The display controller 613 controls a screen display to output images, received from the GPU 612, to a display 3 and a teleconference terminal 7. The sensor controller 614 controls processing of the contact sensor 615. The contact sensor 615 detects that the electronic pen 4 and a user's hand H and the like have contacted on the display 3.

The contact sensor 615 performs an input and detection of coordinates using an infrared cutoff system. As to the method of inputting and detecting coordinates, two light-emitting/receiving devices, each disposed at each upper corner end portions of the display 3, radiate infrared rays parallel to a face of the display 3, and the infrared rays are reflected by reflection members disposed periphery of the display 3, and the light coming back along the same optical paths of the emitted light is received by the two light-emitting/receiving devices. The contact sensor 615 outputs an identification (ID) of the infrared ray, emitted by the two light-emitting/receiving devices and blocked by an object, to the sensor controller 614. The sensor controller 614 specifies or identifies a coordinate position the object, which is the contact position of the object.

Further, the contact sensor 615 can employ systems other than the infrared blocking system. For example, the contact sensor 615 can employ a detection unit, such as a electrostatic capacitance type touch panel that specifies the contact position by detecting a change of electrostatic capacitance, a resistive film type touch panel that specifies the contact position by detecting a voltage change of two opposing resistive films, and an electromagnetic induction type touch panel that that specifies the contact position by detecting the electromagnetic induction caused by touching the object on the display.

The electronic pen controller 616 communicates with the electronic pen 4 to determine whether a pen tip or pen end touches the display 3. Further, the electronic pen controller 616 can determine whether a portion of the electronic pen 4 held by a use or other portion of the electronic pen 4 touches the display 3.

The RF tag reader 617 reads identification information unique to an integrated circuit (IC) card 630 from a RF tag embedded in the IC card 630 using wireless communication. The RF tag reader 617 can be embedded in the electronic information board apparatus 14 or attached to the electronic information board apparatus 14 as an external device. The IC card 630 can be a smart device, such as a smart phone. Further, other than the RF tag reader 617, the electronic information board apparatus 14 can any devices that can acquire identification information identifying users, in which a biometric authentication apparatus (using fingerprint, palm crest, iris and the like) and/or a bar code reader can be used.

As illustrated in FIG. 3, the electronic information board apparatus 14 includes, for example, a bus line 620 such as an address bus and a data bus for electrically connecting the CPU 601, the ROM 602, the RAM 603, the SSD 604, the network controller 605, the external storage controller 606, the capture device 611, the GPU 612, the sensor controller 614, the electronic pen controller 616, and the RF tag reader 617. The programs used for the electronic information board apparatus 14 may be recorded on a recording medium readable by a computer such as a CD-ROM and distributed.

Figure 4:
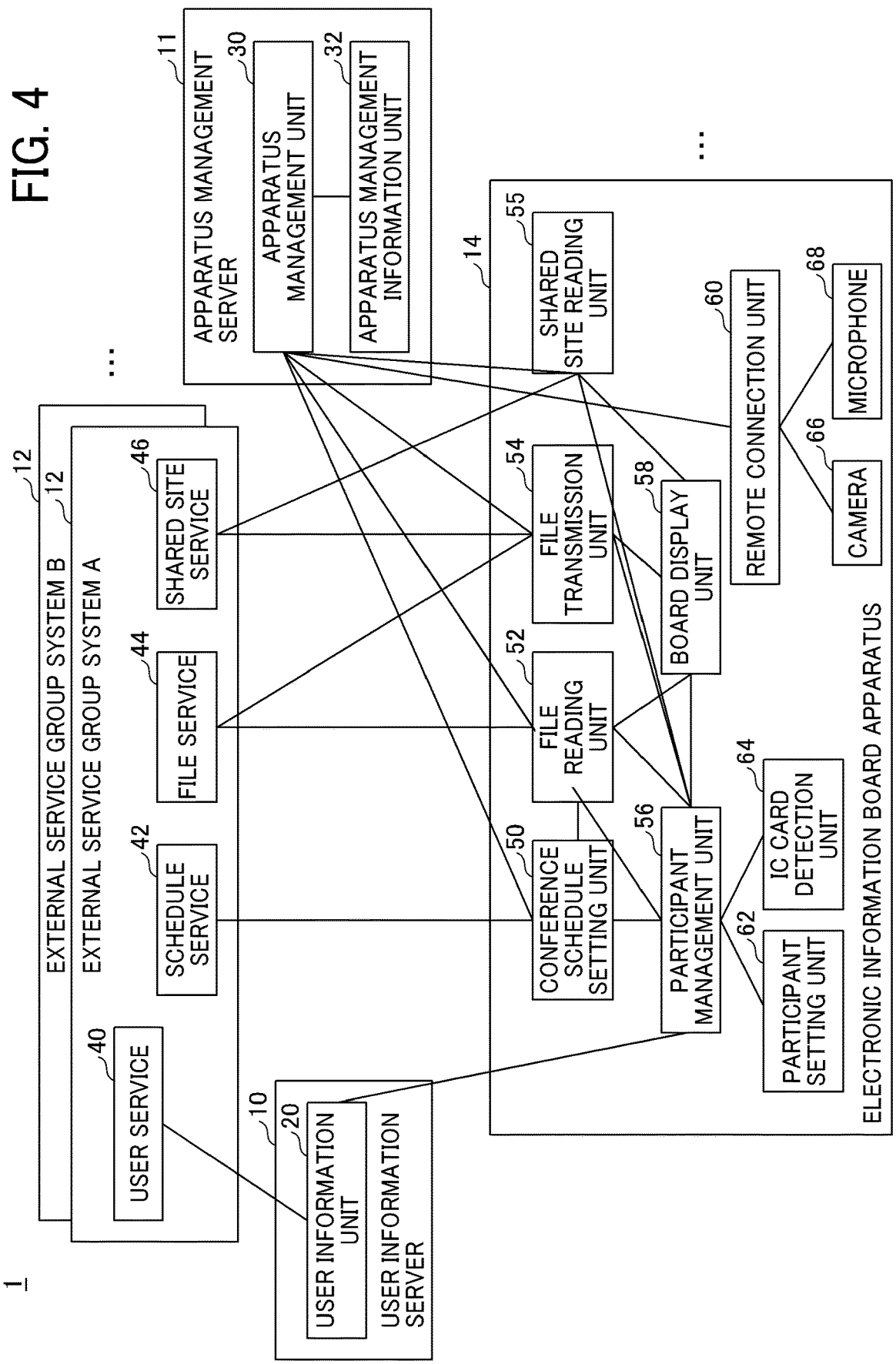
FIG. 4 is an example of a functional block diagram of the information processing system according to the embodiment.

Software Configuration:

The information processing system 1 according to the embodiment can be implemented using, for example, a functional configuration illustrated in FIG. 4. FIG. 4 is an example of a functional block diagram of the information processing system 1 according to the embodiment. The functional configuration of FIG. 4 may omit some parts not related to the description of the embodiment.

As illustrated in FIG. 4, the information processing system 1 includes, for example, the user information server 10, the apparatus management server 11, a plurality of external service group systems 12, and a plurality of electronic information board apparatuses 14. For the simplicity of description, FIG. 4 illustrates one electronic information board apparatus 14. As illustrated in FIG. 4, the external service group system 12 includes, for example, an integrated service consisting of various services, such as a user service 40, a schedule service 42, a file service 44, and a shared site service 46, each of which is an example of the external service in this configuration.

The user service 40 of the external service group system 12 stores, for example, service account information illustrated in FIG. 5. FIG. 5 is an example of a configuration of the service account information. As illustrated in FIG. 5, the service account information includes, for example, user ID, user name, and mail address of user (user of external service) that uses the external service group system 12.

The schedule service 42 stores, for example, conference schedule information illustrated in FIG. 6. FIG. 6 is an example of a configuration of the conference schedule information. For example, as illustrated in FIG. 6, the conference schedule information includes, for example, schedule name, owner user, scheduled time and period, expected participant list, and attachment file of one or more specific conferences.

The file service 44 can store and read files of users. For example, the file service 44 stores storage information illustrated in FIG. 7. FIG. 7 is an example of a configuration of the storage information. For example, as illustrated in FIG. 7, the storage information includes, for example, owner user of file/folder, type of file/folder, and name of file/folder. Thus, the storage information is used to manage or control types of file/folder and names of file/folder owned by each user.

The shared site service 46 is used to store and read folders and files of users on a shared site, and can include a web page having a chat function and a whiteboard function, and stores, for example, shared site information illustrated in FIG. 8. FIG. 8 is an example of a configuration of the shared site information. As illustrated in FIG. 8, the shared site information includes, for example, site name, site uniform resource locator (URL), user, type of file/folder, file or folder URL, and name. Thus, the shared site information of FIG. 8 is used to store and read files, and to manage or control users who can use the web page having the chat function, the whiteboard function, and the like for each shared site.

As illustrated in FIG. 4, the user information server 10 includes, for example, a user information unit 20. The user information unit 20 stores, for example, a user information list illustrated in FIG. 9 and a service information list illustrated in FIG. 10. FIG. 9 is an example of a configuration of the user information list. FIG. 10 is an example of a configuration of the service information list.

As illustrated in FIG. 9, the user information list includes, for example, user ID, name, setting information, service information, and identification information of user (user of electronic information board system) managed or controlled by the electronic information board system.

As illustrated in FIG. 10, the service information list is used to associate the user ID of user of the electronic information board system and the user ID of user of the external service, in which the service information list includes, for example, service information, user ID of electronic information board system, address information, user ID of external service, and authentication token of external service.

The service information included in the user information list (FIG. 9) is used as information for identifying the service information from the service information list of FIG. 10. The identification information included in the user information list (FIG. 9) is used as identification information for identifying a user, which can be input via the IC card detection unit 64 to be described later. For example, an identification information of "ICCARD-123" in FIG. 9 is an example of the identification information unique to the IC card 630 input via the IC card detection unit 64. By utilizing the user information list of FIG. 9, the service information related to the user identified by the identification information using the IC card 630 can be identified from the service information list of FIG. 10.

The service information list of FIG. 10 is a list of service information associated with the user that uses the external service group system 12. The service information is associated with an account (user ID, name, mail address) for each of the external service group systems for each user. Each user has an account of one or more external service group systems. For example, if one user is using two external service group systems, two service information exist for one user. In other words, the service information is an identifier for uniquely identifying all account information that utilizes the information processing system 1 for any account information of any external service groups. The address information and the user ID of the external service are examples of connection information when establishing a connection to the external service group system 12. The authentication token of external service is an example of authentication information for successfully accessing the external service group system 12.

As illustrated in FIG. 4, the electronic information board apparatus 14 includes, for example, a conference schedule setting unit 50, a file reading unit 52, a file transmission unit 54, a shared site reading unit 55, a participant management unit 56 (participant control unit), a board display unit 58, a remote connection unit 60, a participant setting unit 62, an IC card detection unit 64, a camera 66, and a microphone 68.

The IC card detection unit 64 reads identification information from the IC card 630 of a user.

The participant management unit 56 transmits the identification information read by the IC card detection unit 64 to the user information server 10 and acquires the user's service information corresponding to the identification information from the user information unit 20 of the user information server 10. The participant management unit 56 transmits the user's service information, acquired from the user information unit 20, to the conference schedule setting unit 50, the file reading unit 52, the file transmission unit 54 and the shared site reading unit 55.

The conference schedule setting unit 50 uses the service information of a specific user received from the participant management unit 56 to acquire the conference schedule information having the expected participant list including the specific user, from the schedule service 42. Further, the conference schedule setting unit 50 also includes a user interface (UI) that allows the user to select a specific schedule from the acquired conference schedule information.

When the specific schedule is selected by the user, the conference schedule setting unit 50 reads information on attachment file included in the conference schedule information of the specific schedule selected by the user, and then the conference schedule setting unit 50 instructs the file reading unit 52 to communicate with the external service group system 12 to acquire the attachment file from the external service group system 12. It should be noted that the attached file is not necessarily attached to the specific schedule selected by the user. In a case that the specific schedule is selected by the user, in addition to reading information on the attachment file, the participant information included in the expected participant list can be acquired. When the specific schedule is selected by the user, the conference schedule setting unit 50 transmits an identifier (identification information) of the electronic information board apparatus 14 and information on the specific schedule selected by the user to the apparatus management server 11.

The identifier (identification information) of the electronic information board apparatus 14 can be any information that can identify the electronic information board apparatus 14, and various information such as an internet protocol (IP) address and media access control (MAC) address can be used. The schedule information can be a specific schedule name, or an ID that indicates a specific schedule.

The file reading unit 52 has a function of reading a file from the file service 44 of the external service group system 12 into the electronic information board apparatus 14. Further, the file reading unit 52 also includes a UI that allows the user to select a file to be read from the file service 44 of the external service group system 12 into the electronic information board apparatus 14. The file reading unit 52 can read the file from the file service 44 into the electronic information board apparatus 14 using the user's service information received from the participant management unit 56.

Further, when a specific file in the file service 44 is selected by a user as a to-be-read file, the file reading unit 52 transmits the identifier (identification information) of the electronic information board apparatus 14 and information on the specific file selected by the user to the apparatus management server 11. The information on the specific file may be a specific file name or file path and/or an ID identifying the specific file.

The shared site reading unit 55 has a function of reading a specific file from the shared site service 46 of the external service group system 12 into the electronic information board apparatus 14, and a function of providing a web page having a chat function and a whiteboard function. Further, the shared site reading unit 55 also includes a user interface (UI) that allows a user to select a specific file to be read from the shared site service 46 of the external service group system 12 into the electronic information board apparatus 14. The shared site reading unit 55 can read the specific file from the shared site service 46 into the electronic information board apparatus 14 using the user's service information received from the participant management unit 56.

Further, if the shared site service 46 has a display function of the web page having the chat function and the whiteboard function, the shared site reading unit 55 can read the web page from the shared site service 46 using a web browser provided for the electronic information board apparatus 14. The shared site reading unit 55 transmits a specific file, folder and site URL of web page read from the shared site service 46 to the apparatus management server 11 as similar to the file reading unit 52.

The file transmission unit 54 acquires board content written on a display board of the electronic information board apparatus 14 from the board display unit 58, and transmits the acquired board content to the file service 44 or the shared site service 46, using the user's service information received from the participant management unit 56, to store the acquired board content into the file service 44 or the shared site service 46.

The file transmission unit 54 includes a UI having a screen used for selecting a folder (storage folder) used as a file storage destination, and a screen used for storing a file in the selected storage folder. For example, a user selects a specific storage folder at the time of starting a conference and saves one or more files in the specific storage folder at the time of closing the conference. Further, in response to a selection of the specific storage folder, the file transmission unit 54 transmits the identifier (identification information) of the electronic information board apparatus 14 and the information of the specific storage folder selected by the user to the apparatus management server 11.

The board display unit 58 displays a file read by the file reading unit 52 or the shared site reading unit 55 from the file service 44 or the shared site service 46, respectively. Further, the board display unit 58 receives content written by a user on the electronic information board apparatus 14 and displays the written content as the board content. Further, the board display unit 58 provides the content of a file read by the file reading unit 52 or the shared site reading unit 55 from the file service 44 or the shared site service 46, respectively, and the content written by the user on the electronic information board apparatus 14 to the file transmission unit 54 as the board content.

As illustrated in FIG. 4, the apparatus management server 11 includes, for example, an apparatus management unit 30 (apparatus control unit) and an apparatus management information unit 32 (apparatus control information unit). The apparatus management unit 30 writes information received from the conference schedule setting unit 50, the file reading unit 52, the file transmission unit 54, and/or the shared site reading unit 55 into the apparatus management information as illustrated in FIG. 11. The apparatus management information unit 32 stores the apparatus management information illustrated in FIG. 11. FIG. 11 is an example of a configuration of the apparatus management information.

As illustrated in FIG. 11, the apparatus management information stores one or more pieces of resource information and the identification information of the electronic information board apparatus 14 (i.e., information processing apparatus) in association with each other. For example, the apparatus management information stores the resource information, such as schedule name, file name, storage folder, web page (URL) and shared site information, and the identification information of the electronic information board apparatus 14, such as an internet protocol (IP) address (apparatus IP address) in association with each other. The schedule name included in the apparatus management information can be selected by a user or selected automatically in response to user authentication and time information (e.g., current time information). Further, the schedule name included in the apparatus management information may not be selected directly by the user. For example, if a specific resource, such as the schedule name, can be identified by any operation (e.g., authentication operation in a case of schedule) initiated by the user, the specific resource can be selected without a direct operation of the user. The automatically selectable resource is not limited to the schedule name. For example, one or more specific resources set as initial settings for a specific user, such as a file and web site, can be automatically read in response to the successful authentication of the specific user.

The remote connection unit 60 uses the IP address to perform the remote information sharing of the board content, camera-captured images and microphone-received audio between the electronic information board apparatuses 14. The remote connection unit 60, which displays a connection destination recommendation screen (FIG. 19) or a connection destination selection screen (FIG. 21) to be described later, includes a UI that receives a remote connection request from the user. Before displaying the connection destination recommendation screen or the connection destination selection screen, the remote connection unit 60 acquires the apparatus management information from the apparatus management server 11.

In response to acquisition of the apparatus management information (FIG. 11), the remote connection unit 60 of one electronic information board apparatus 14 (first electronic information board apparatus, first apparatus) compares the apparatus management information of the one electronic information board apparatus 14 (first apparatus) and the apparatus management information of another electronic information board apparatus 14 (second electronic information board apparatus, second apparatus). If another electronic information board apparatus 14 (second apparatus) is set with any one of the schedule name, file name, storage folder, web page (URL), or shared site information included in the apparatus management information, that matches the schedule name, file name, storage folder, web page (URL), or shared site information included in the apparatus management information set for one electronic information board apparatus 14 (first apparatus), the remote connection unit 60 of the one electronic information board apparatus 14 (first apparatus) displays the connection destination recommendation screen, in which another electronic information board apparatus 14 (second apparatus) is recommended as a remote connection destination (recommendable remote connection destination).

Further, if any one of the schedule name, file name, storage folder, web page (URL), or shared site information included in the apparatus management information set for another electronic information board apparatus 14 (second apparatus) matches the schedule name, file name, storage folder, web page (URL), or shared site information included in the apparatus management information set for one electronic information board apparatus 14 (first apparatus), the remote connection unit 60 of the one electronic information board apparatus 14 can automatically connect the one electronic information board apparatus 14 to another electronic information board apparatus 14 as a remote connection apparatus without displaying the connection destination recommendation screen.

Further, if the schedule name, file name, storage folder, web page (URL), and shared site information included in the apparatus management information set for another electronic information board apparatus 14 (second apparatus) do not match the schedule name, file name, storage folder, web page (URL), and shared site information included in the apparatus management information set for one electronic information board apparatus 14 (first apparatus), the remote connection unit 60 of the electronic information board apparatus 14 may display the connection destination selection screen including other connectable electronic information board apparatus 14 as the remote connection destination.

Further, the remote connection destination determination can be performed without using the remote connection unit 60. For example, the remote connection destination determination can be performed by the apparatus management unit 30 in the apparatus management server 11 instead of the remote connection unit 60. In this case, the remote connection unit 60 acquires information of the recommendable remote connection destination from the apparatus management server 11.

Figure 12:
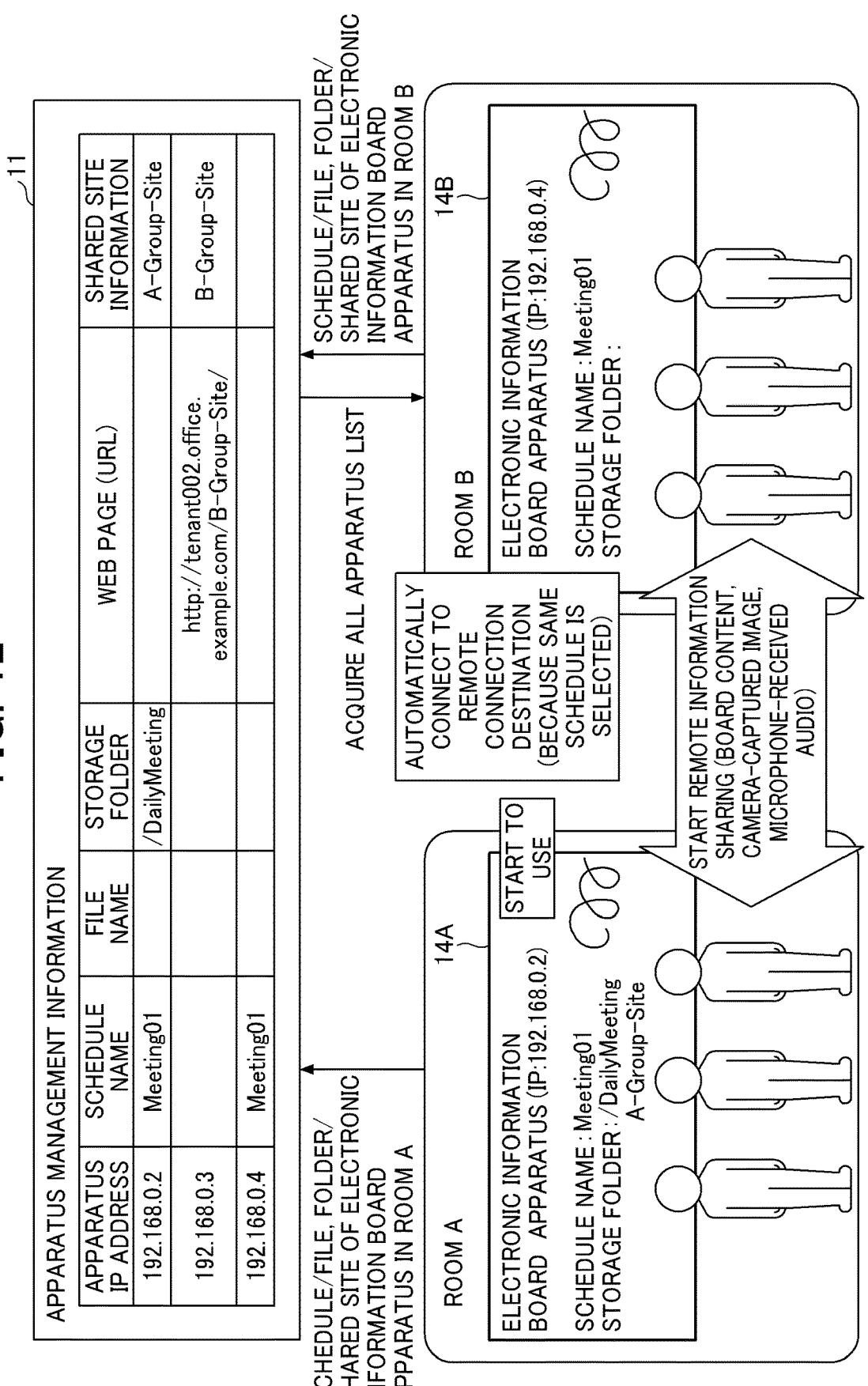
FIG. 12 illustrates a scheme of processing in the information processing system according to the embodiment.

Processing:

FIG. 12 illustrates a scheme of processing in the information processing system 1 according to the embodiment. FIG. 12 illustrates an example case of performing the remote information sharing between the electronic information board apparatuses 14 located in different rooms, in which the electronic information board apparatus 14A located in "Room A" and the electronic information board apparatus 14B located in "Room B" perform the remote information sharing. Each of the electronic information board apparatuses 14A and 14B have a function of performing the remote information sharing, such as sharing board-written content (hereinafter, board content), camera-captured images and microphone-received audio (e.g., voices) between the electronic information board apparatuses 14A and 14B. Further, it is assumed that the remote information sharing function can be performed if an internet protocol (IP) address is set for the electronic information board apparatus 14 located at each remote connection destination. Further, the number of the electronic information board apparatuses 14 and the number of the sites where the electronic information board apparatuses 14 are located is not limited to two, but can be any plural numbers as needed.

In the information processing system 1 according to the embodiment, it is assumed that the electronic information board apparatus 14, which performs the remote information sharing, uses one or more external services, such as the schedule service 42 and the file service 44 of the external service group system 12.

For example, each of a plurality of electronic information board apparatuses 14 that can perform the remote information sharing has a function of selecting the conference schedule information managed by the schedule service 42 and reading the attachment file associated with the selected conference schedule information. Further, each of the plurality of electronic information board apparatuses 14, which performs the remote information sharing, has a function of selecting a file to be read from the file service 44 and/or the shared site service 46 and reading the selected file. Further, each of the plurality of electronic information board apparatuses 14, which performs the remote information sharing, has a function of selecting a web page having a chat function and a whiteboard function provided by the shared site service 46 and reading the web page. Further, each of the plurality of electronic information board apparatuses 14, which performs the remote information sharing, has a function of selecting a storage folder used for storing a file of the board content from the file service 44 and/or the shared site service 46, and storing the file of the board content into the selected storage folder.

As above described, various resource information, such as the conference schedule information, file, storage folder, web page (URL), and shared site information (i.e., resource information stored in the external service), selected by the user using the electronic information board apparatus 14, can be managed as the apparatus management information by the apparatus management server 11 in association with the identifier (identification information) of the electronic information board apparatus 14.

When one electronic information board apparatus 14 performs the remote information sharing with another electronic information board apparatus 14, one electronic information board apparatus 14 refers to the apparatus management server 11 to search for another electronic information board apparatus 14 that selects specific resource information that matches the specific resource information (e.g., conference schedule information) stored in the external service selected by the one electronic information board apparatus 14. Then, another electronic information board apparatus 14, which selects the specific resource information that matches the specific resource information selected by the one electronic information board apparatus 14, is presented to the user as a recommendable remote connection destination. Alternatively, another electronic information board apparatus 14, which selects the specific resources information that matches the specific resource information selected by the one electronic information board apparatus 14, can be automatically selected as the remote connection destination to be connected with.

Hereinafter, a description is given of a case that the electronic information board apparatus 14A of FIG. 12 has selected the conference schedule information, the storage folder, the web page (URL) and the shared site information at first, and then the electronic information board apparatus 14B is to select the conference schedule information. In response to the selection of the conference schedule information, the storage folder, the web page (URL) and the shared site information at the electronic information board apparatus 14A by a user, a use of the electronic information board apparatus 14A starts. Further, the electronic information board apparatus 14A associates the conference schedule information, the storage folder, the web page (URL) and the shared site information selected by the user with the IP address of the electronic information board apparatus 14A and causes the apparatus management server 11 to control or manage the associated information. In this example case, at first, it is assumed that there is no other electronic information board apparatus 14 that selects the specific resource information that matches the specific resource information selected by the electronic information board apparatus 14A.

In response to starting the use of the electronic information board apparatus 14A, a user of the electronic information board apparatus 14B selects the conference schedule information. Then, the electronic information board apparatus 14B associates the conference schedule information selected by the user with the IP address of the electronic information board apparatus 14B and causes the apparatus management server 11 to control or manage the associated information. In this configuration, the electronic information board apparatuses 14 can be configured to acquire the apparatus management information from the apparatus management server 11.

Since the electronic information board apparatus 14A, which has selected the same specific resource (e.g., conference schedule information) selected by the electronic information board apparatus 14B, exists, the electronic information board apparatus 14B presents the electronic information board apparatus 14A as the recommendable remote connection destination to the user in "Room B." Further, the electronic information board apparatus 14B can be configured to automatically select the electronic information board apparatus 14A, which has selected the same specific resource, as the remote connection destination.

As described above, in the information processing system 1 according to the embodiment, another electronic information board apparatus 14 which has selected the same specific resource can be presented to the user as the remote connection destination, or another electronic information board apparatus 14 which has selected the same specific resource can be automatically selected as the remote connection destination, with which the user's workload can be reduced.

Further, the presentation of the recommendable remote connection destination to the user and the selection of the remote connection destination to be connected automatically can be performed after receiving an instruction of remote information sharing from the user, or the presentation of the recommendable remote connection destination to the user and the selection of the remote connection destination to be connected automatically can be performed before receiving the instruction of remote information sharing from the user.

Figures 2, 13A:
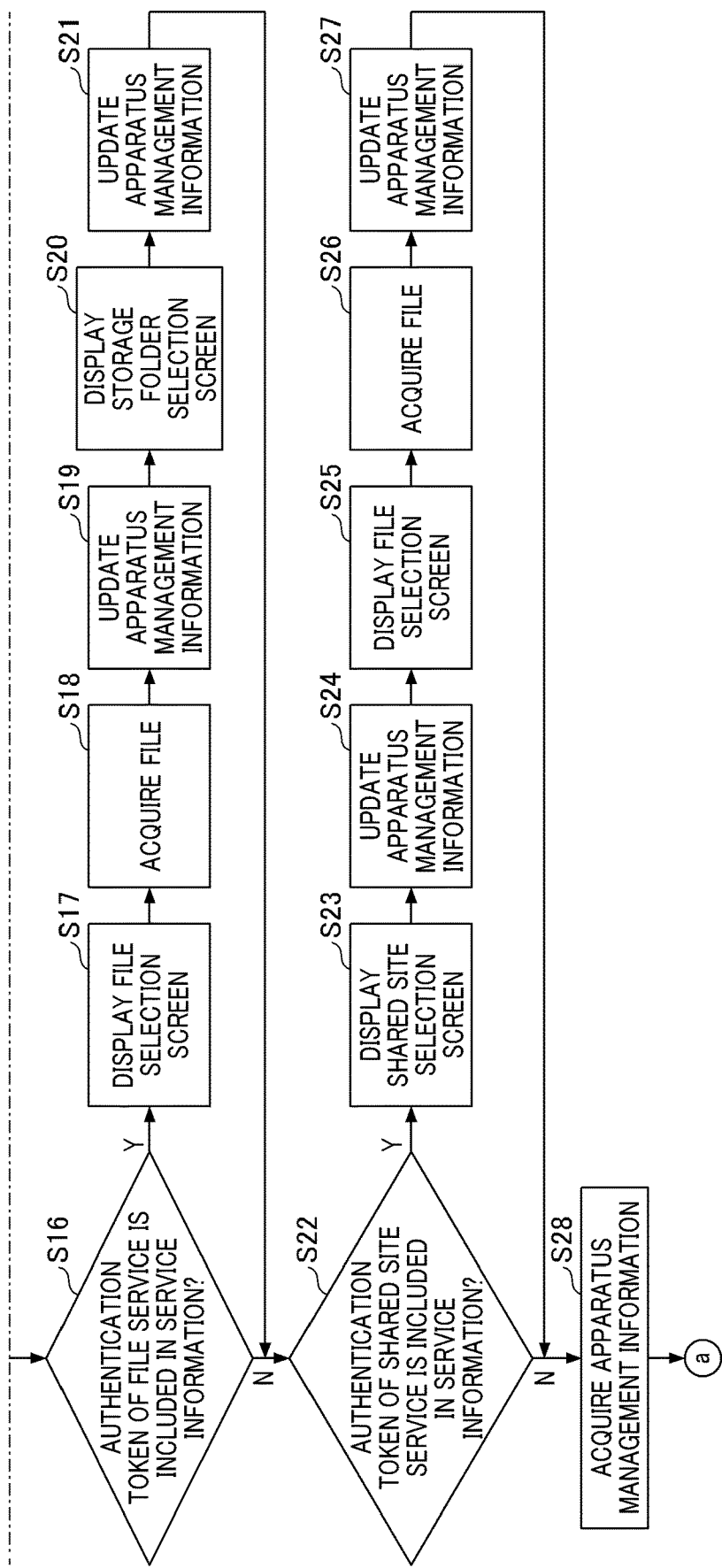

Hereinafter, a description is given of the processing from the start to completion of the remote information sharing. FIGS. 13A-1 and 13A-2 (FIG. 13A) and 13B are an example of flowchart illustrating the steps of the processing in the information processing system 1 according to the embodiment.

In step S11, a user holds or places the IC card 630 over the IC card detection unit 64. Then, the IC card detection unit 64 reads the identification information from the IC card 630 held by the user.

In step S12, the participant management unit 56 acquires the identification information read by the IC card detection unit 64. Then, the participant management unit 56 transmits the acquired identification information to the user information server 10 to acquire the service information of the user corresponding to the acquired identification information. If the user information list (FIG. 9) and the service information list (FIG. 10) are used and the acquired identification information is "ICCARD-123," the user ID of "user001" can be identified from the user information list (FIG. 9), and then the service information (FIG. 14) can be identified from the service information list (FIG. 10). FIG. 14 is an example of a configuration of the service information identified from the acquired identification information.

If the authentication token of the schedule service 42 is included in the service information acquired in step S12 (step S13: YES), the conference schedule setting unit 50 performs processing in steps S14 and S15. On the other hand, if the authentication token of the schedule service 42 is not included in the service information acquired in step S12 (step S13: NO), the conference schedule setting unit 50 skips the processing in steps S14 and S15.

In step S14, the conference schedule setting unit 50 displays, for example, a schedule selection screen 1000 illustrated in FIG. 15. FIG. 15 is an example of the schedule selection screen 1000. The schedule selection screen 1000 is a screen used for selecting a schedule of a specific user identified by the participant management unit 56. Since the schedule includes "scheduled time and period," the schedule can be selected automatically from the time information (e.g., current time information).

In step S15, the conference schedule setting unit 50 transmits the schedule information (e.g., schedule name) selected from the schedule selection screen 1000 (FIG. 15) by the user or the schedule information automatically set from the time information (e.g., current time information) and user authentication information, to the apparatus management server 11 together with the IP address of the electronic information board apparatus 14, and causes the apparatus management server 11 to update, for example, the apparatus management information (FIG. 11).

If the authentication token of the file service 44 is included in the service information acquired in step S12 (step S16: YES), the file reading unit 52 or the file transmission unit 54 performs processing in steps S17 to S21. On the other hand, if the authentication token of the file service 44 is not included in the service information acquired in step S12 (step S16: NO), the file reading unit 52 or the file transmission unit 54 skips the processing in steps S17 to S21.

In step S17, the file reading unit 52 displays, for example, a file selection screen 1100 illustrated in FIG. 16. FIG. 16 is an example of the file selection screen 1100. The file selection screen 1100 can be used as a screen by the user identified by the participant management unit 56 to select a file of the owner user.

In step S18, the file reading unit 52 acquires, from the file service 44, the file selected from the file selection screen 1100 (FIG. 16) by the user, and displays the selected file using the board display unit 58.

In step S19, the file reading unit 52 transmits information of the selected file (e.g., file name) and the IP address of the electronic information board apparatus 14 to the apparatus management server 11 to cause the apparatus management server 11 update, for example, the apparatus management information (FIG. 11).

Figure 17:
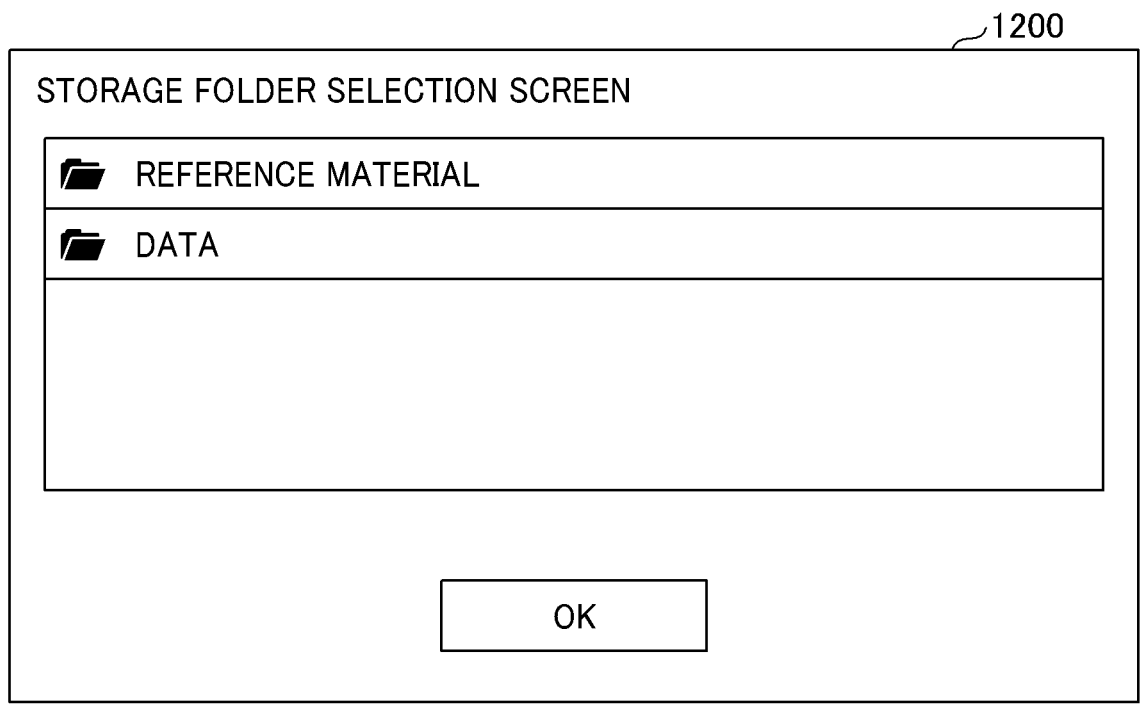
FIG. 17 is an example of a storage folder selection screen.

In step S20, the file reading unit 52 displays, for example, a storage folder selection screen 1200 illustrated in FIG. 17. FIG. 17 is an example of the storage folder selection screen 1200. The storage folder selection screen 1200 can be used as a screen by the user identified by the participant management unit 56 to select a folder of the owner user.

In step S21, the file reading unit 52 transmits the folder information (e.g., folder path) selected from the storage folder selection screen 1200 (FIG. 17) by the user and the IP address of the electronic information board apparatus 14 to the apparatus management server 11 to cause the apparatus management server 11 update, for example, the apparatus management information (FIG. 11).

If the authentication token of the shared site service 46 is included in the service information acquired in step S12 (step S22: YES), the file transmission unit 54 or the shared site reading unit 55 performs processing in step S23 to S27. On the other hand, if the authentication token of the shared site service 46 is not included in the service information acquired in step S12 (step S22: NO), the file transmission unit 54 or the shared site reading unit 55 skips the processing in steps S23 to S27.

Figure 18:
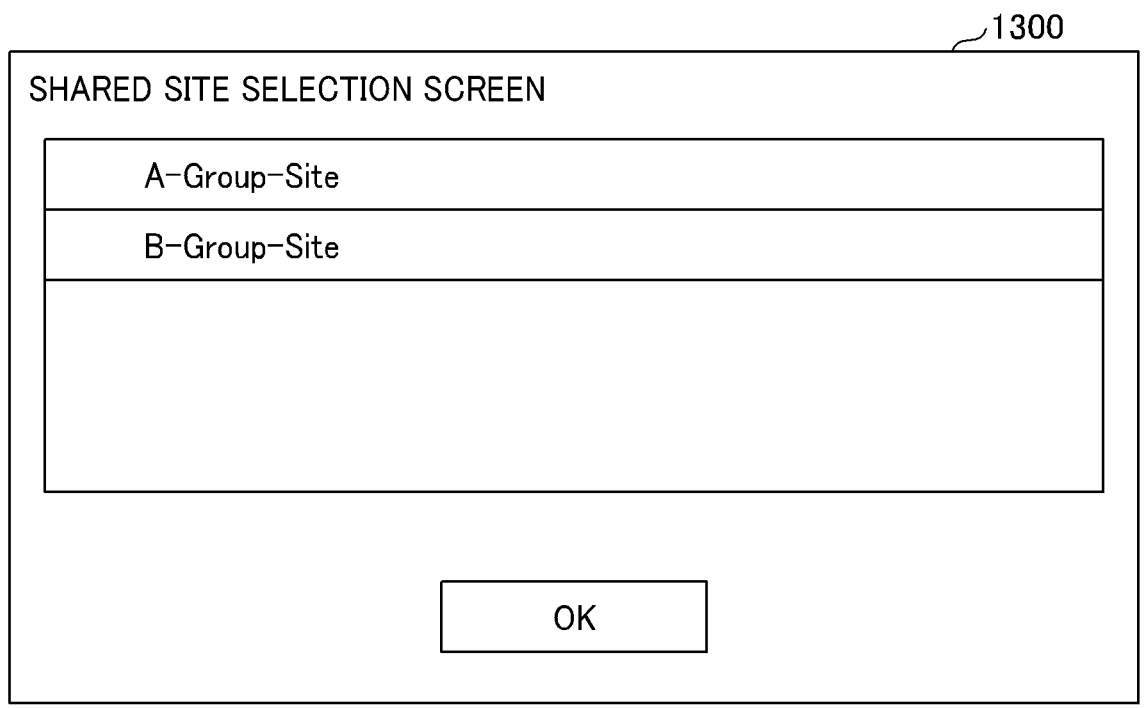
FIG. 18 is an example of a shared site selection screen.

In step S23, the shared site reading unit 55 displays, for example, a shared site selection screen 1300 illustrated in FIG. 18. FIG. 18 is an example of the shared site selection screen 1300. The shared site selection screen 1300 can be used as a screen for selecting a shared site useable by the user identified by the participant management unit 56.

In step S24, the shared site reading unit 55 transmits the shared site information selected from the shared site selection screen 1300 (FIG. 18) by the user and the IP address of the electronic information board apparatus 14 to the apparatus management server 11 to cause the apparatus management server 11 update, for example, the apparatus management information (FIG. 11).

In step S25, the shared site reading unit 55 displays, for example, the file selection screen 1100 (FIG. 16). The file selection screen 1100 displayed in step S25 can be used as a screen for selecting one or more files in the shared site useable by the user identified by the participant management unit 56.

In step S26, the shared site reading unit 55 acquires, from the shared site service 46, a file selected from the file selection screen 1100 (FIG. 16) by the user. Then, the shared site reading unit 55 instructs the board display unit 58 to display the file acquired from the shared site service 46.

In step S27, the shared site reading unit 55 transmits information of the file (e.g., file name) and the IP address of the electronic information board apparatus 14 to the apparatus management server 11 to cause the apparatus management server 11 update, for example, the apparatus management information (FIG. 11).

In step S28, the remote connection unit 60 acquires the apparatus management information (FIG. 11) from the apparatus management unit 30 of the apparatus management server 11.

In step S29, the remote connection unit 60 of one electronic information board apparatus 14 (first electronic information board apparatus) compares the apparatus management information of one electronic information board apparatus 14 (first electronic information board apparatus) stored in the external resource and the apparatus management information of another electronic information board apparatus 14 (second electronic information board apparatus) stored in the external resource to determine whether there is any another electronic information board apparatus 14 (second electronic information board apparatus), having at least one piece of the apparatus management information (resource information) stored in the external resource for another electronic information board apparatus 14 matching one piece of the apparatus management information (resource information) stored in the external resource for the one electronic information board apparatus 14, selected by the user operation at the one electronic information board apparatus 14.

If there is no another electronic information board apparatus 14 having at least one piece of the apparatus management information (resource information) that matches any one piece of the apparatus management information (resource information) of the one electronic information board apparatus 14 (step S29: NO), the board display unit 58 proceeds the sequence to step S30, in which the user does not use the remote information sharing function, and the one electronic information board apparatus 14 displays images drawn by the electronic pen or the hand and causes the users to perform a one-site alone conference. The processing in step S30 is performed until a remote information sharing request to be described later is received from another electronic information board apparatus 14.

On the other hand, if there is any another electronic information board apparatus 14 having at least one piece of the apparatus management information (resource information) that matches any one piece of the apparatus management information (resource information) of the one electronic information board apparatus 14 (step S29: YES), the sequence proceeds to step S33, in which the remote connection unit 60 displays, for example, a connection destination recommendation screen 1400 illustrated in FIG. 19.

Figure 19:
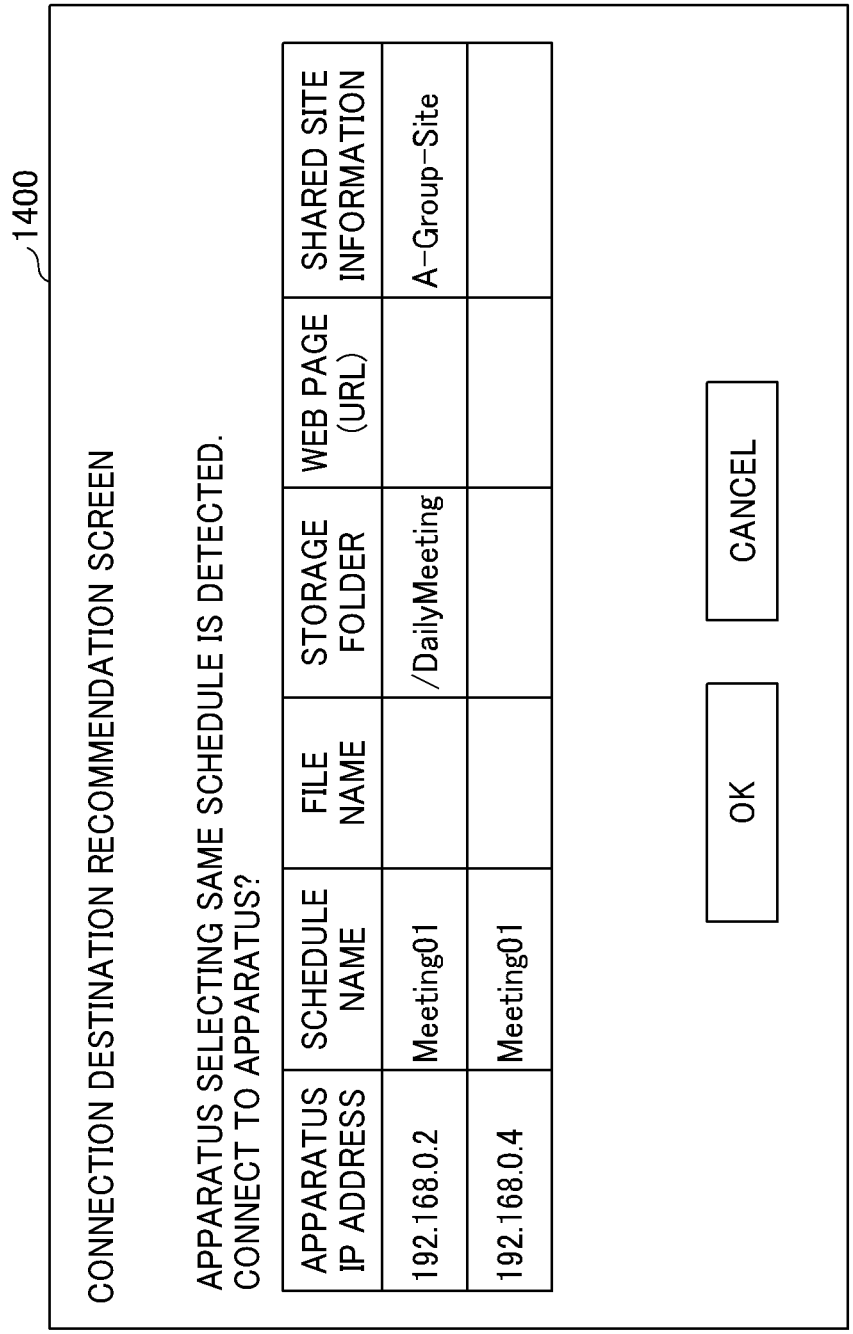
FIG. 19 is an example of a connection destination recommendation screen.

FIG. 19 is an example of the connection destination recommendation screen 1400. The connection destination recommendation screen 1400 can be used as a screen that presents, the user, another electronic information board apparatus 14, which is determined to have at least one piece of the apparatus management information (resource information) that matches any one piece of the apparatus management information (resource information) of the one electronic information board apparatus 14 (step S29: YES) as the recommendable remote connection destination.

If a "cancel" button is pressed on the connection destination recommendation screen 1400 (FIG. 19) in step S34, the user can select not initiating the remote information sharing. If the user presses the "cancel" button on the connection destination recommendation screen 1400 (S34: Cancel), the board display unit 58 proceeds the sequence to step S30, in which the user does not use the remote information sharing function, and the one electronic information board apparatus 14 displays images drawn by the electronic pen or the hand and causes the users to perform the one-site alone conference.

On the other hand, if an "OK" button is pressed on the connection destination recommendation screen 1400 (FIG. 19) in step S34, the user can instruct a start of the remote information sharing with another electronic information board apparatus 14 presented as the recommendable remote connection destination on the connection destination recommendation screen 1400.

If the user presses the "OK" button on the connection destination recommendation screen 1400 (S34: OK), the sequence proceeds to step S35, in which the remote connection unit 60 transmits a remote information sharing request to another electronic information board apparatus 14 presented as the recommendable remote connection destination on the connection destination recommendation screen 1400 (FIG. 19).

Figure 20:
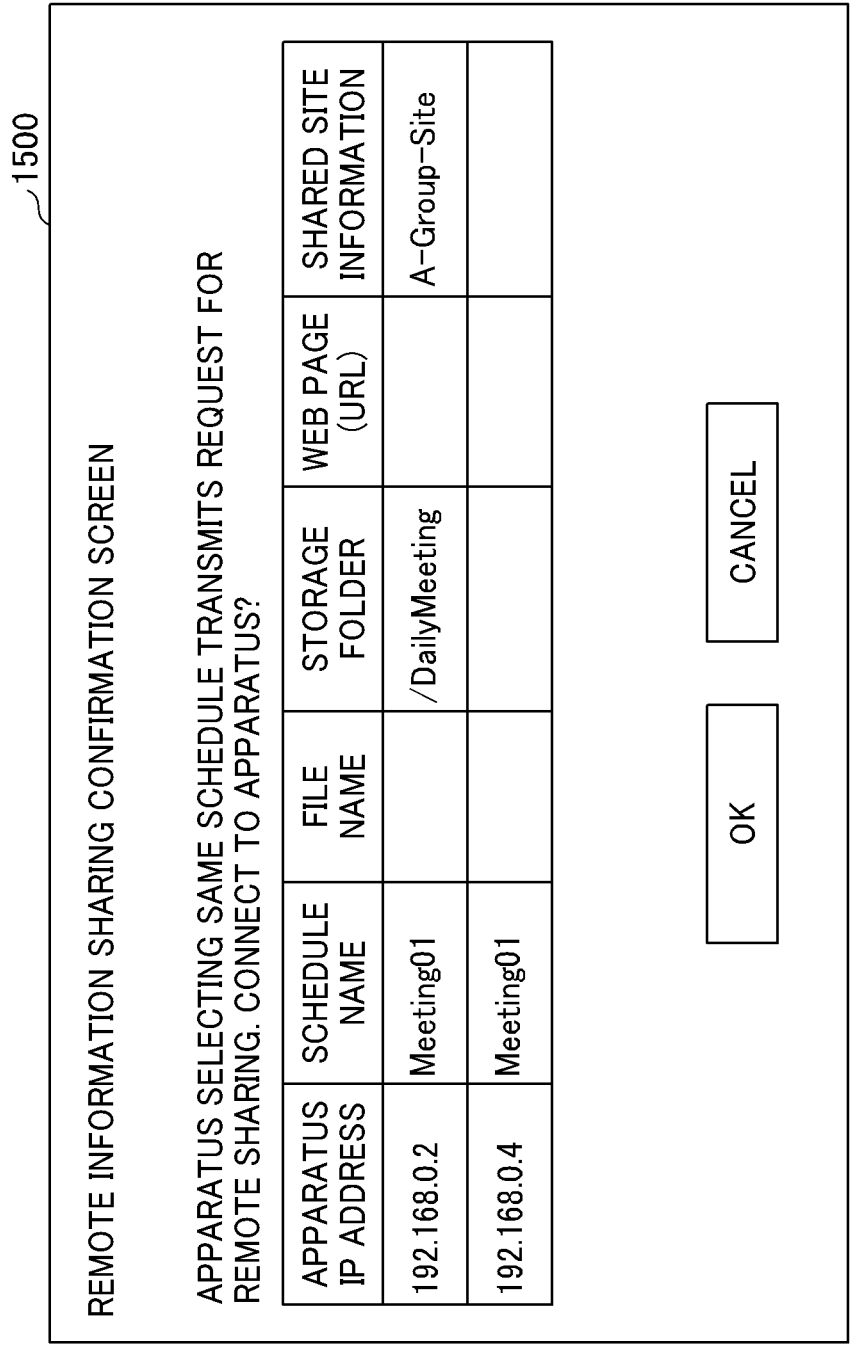
FIG. 20 is an example of a remote information sharing confirmation screen.

While the user is performing the one-site alone conference (step S30), if the remote connection unit 60 of the electronic information board apparatus 14 receives the remote information sharing request (S31: YES), the sequence proceeds to step S32, in which the remote connection unit 60 displays, for example, a remote information sharing confirmation screen 1500 illustrated in FIG. 20. FIG. 20 is an example of the remote information sharing confirmation screen 1500. By displaying the remote information sharing confirmation screen 1500, the user can confirm that the remote information sharing request has been issued from another electronic information board apparatus 14.

If a "cancel" button is pressed on the remote information sharing confirmation screen 1500 (FIG. 20) in step S34, the user can select not initiating the remote information sharing. If the user presses the "cancel" button (S34: Cancel), the board display unit 58 proceeds the sequence to step S30, in which the user does not use the remote information sharing function, and the one electronic information board apparatus 14 displays images drawn by the electronic pen or the hand and causes the user to perform the one-site alone conference.

If the use presses an "OK" button on the remote information sharing confirmation screen 1500 (S34: OK), the user can instruct a start of the remote information sharing with another electronic information board apparatus 14 presented as the recommendable remote connection destination on the remote information sharing confirmation screen 1500. If the use presses the "OK" button on the remote information sharing confirmation screen 1500 (S34: OK), the sequence proceeds to step S35, in which the remote connection unit 60 of the one electronic information board apparatus 14 transmits a response for the remote information sharing request to another electronic information board apparatus 14 presented as the recommendable remote connection destination on the remote information sharing confirmation screen 1500 (FIG. 20).

Then, another electronic information board apparatus 14, which has issued the remote information sharing request, and the one electronic information board apparatus 14, which has transmitted the response for the remote information sharing request, initiate the remote information sharing. After starting or initiating the remote information sharing in step S35, the plurality of electronic information board apparatuses 14 which are performing the remote information sharing proceeds to step 36 to allow the users to perform a multi-site conference by sharing the board content, camera-captured image and microphone-received audio (e.g., voices).

In step S37, the file transmission unit 54 saves a file of the board content to the storage folder selected in step S20. If the user presses a conference end button and terminates the conference in step S38, the participant management unit 56 transmits an update instruction to the apparatus management server 11 to reset the apparatus management information of the electronic information board apparatuses 14. The resetting of apparatus management information includes, for example, a process of deleting the schedule name, file name, storage folder, web page (URL) and shared site information in the apparatus management information of FIG. 11. The participant management unit 56 also instructs the board display unit 58 to discard the displayed content.

If the user presses the conference end button in step S38, the electronic information board apparatus 14 can also perform the log-off of the user that has logged in using the IC card 630, and can further proceed to a sleep mode and a power off mode.

Further, if there is no another electronic information board apparatus 14 having at least one piece of the apparatus management information (resource information) that matches any one piece of the apparatus management information (resource information) of the one electronic information board apparatus 14 (S29: NO), the one electronic information board apparatus 14 can display, for example, a connection destination selection screen 1600 illustrated in FIG. 21 to facilitate the user to select a remote connection destination. FIG. 21 is an example of the connection destination selection screen 1600. For example, if the system is assumed to use a remote connection function such as a video conference system, it is preferable to display the connection destination selection screen 1600 illustrated in FIG. 21.

Further, even if there is any another electronic information board apparatus 14 having at least one piece of the apparatus management information (resource information) that matches any one piece of the apparatus management information (resource information) of the one electronic information board apparatus 14 (S29: YES), the one electronic information board apparatus 14 can also display the connection destination selection screen 1600 (FIG. 21) to facilitate the user to select the remote connection destination. In this case, it is preferable to display the recommendable remote connection destination with a higher priority, such as displaying the recommendable remote connection destination with the selected status (e.g., highlighted), and setting a display order of the recommendable remote connection destination at the higher position.

Figure 13B:
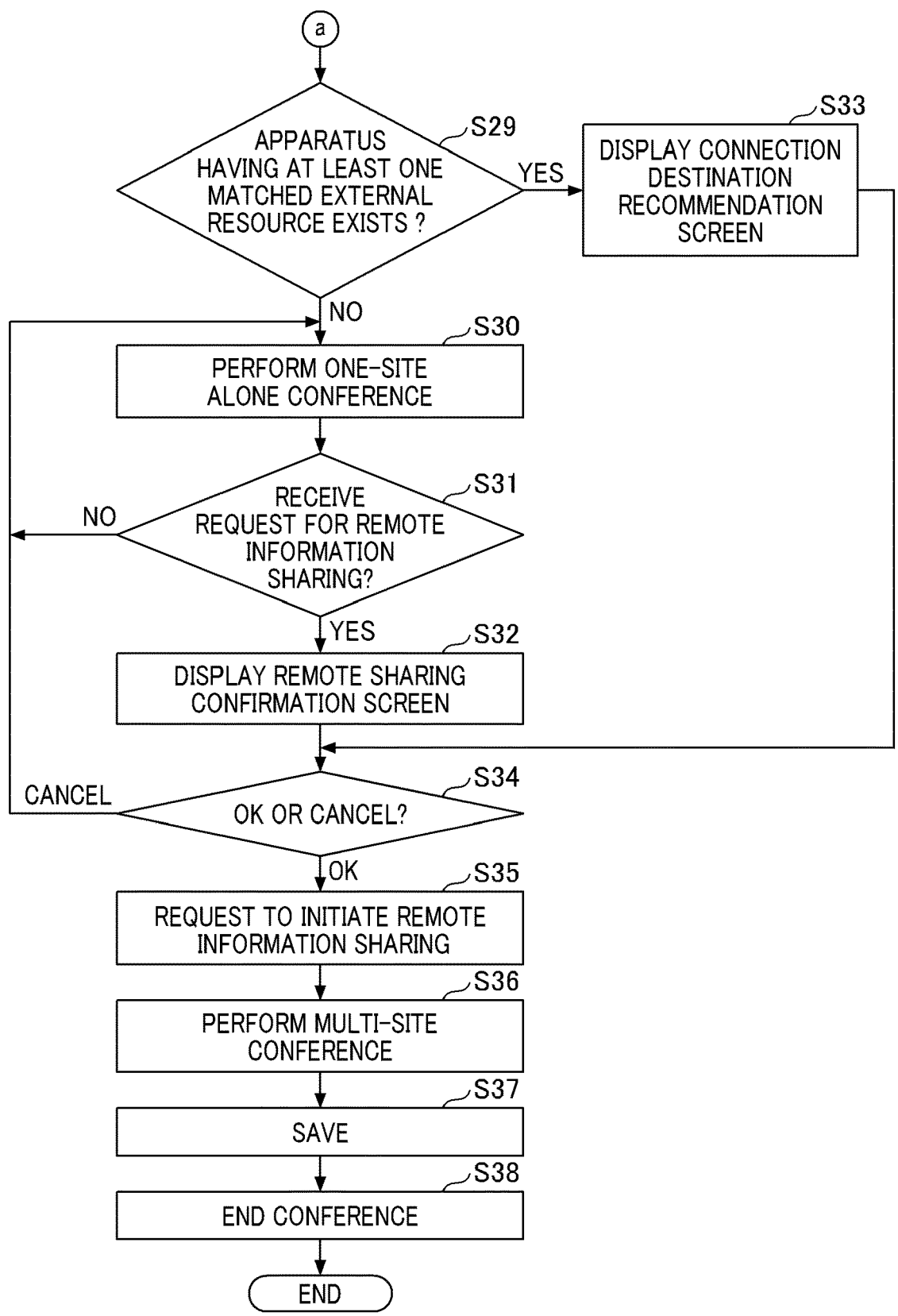
FIG. 13B is an example of flowchart illustrating the steps of the processing in the information processing system continued from FIG. 13A.
Figure 22C:
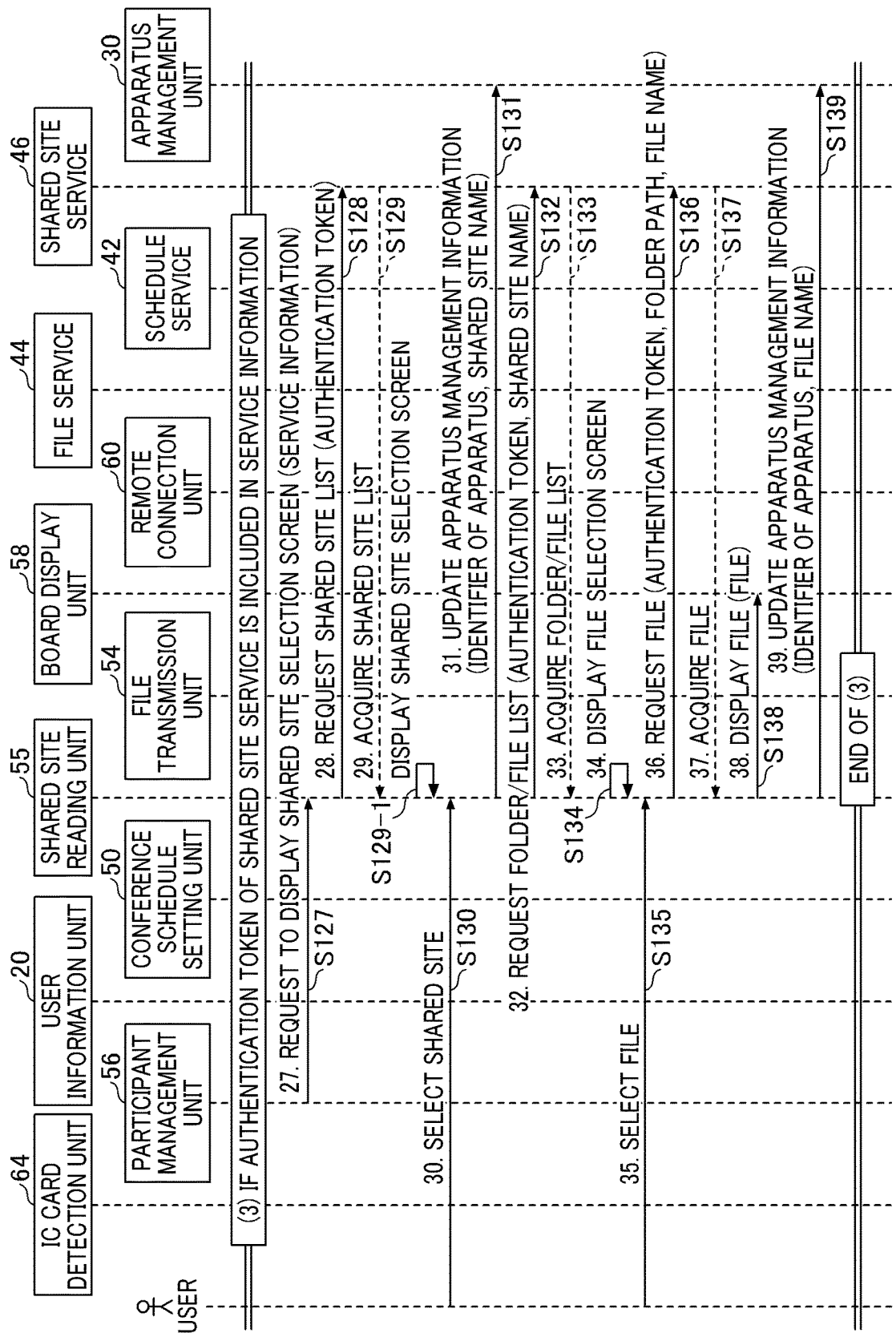

Hereinafter, a description is given of the processing from the start to completion of the remote information sharing illustrated in FIGS. 13A and 13B with reference to sequence diagrams of FIGS. 22A to 22D (FIG. 22). FIGS. 22A, 22B, 22C and 22D (FIG. 22) are examples of sequence diagrams describing the processing in the information processing system 1 according to the embodiment.

In step S101, a user holds or places the IC card 630 over the IC card detection unit 64.

In step S102, the IC card detection unit 64 reads identification information from the IC card 630 of the user.

In step S103, the IC card detection unit 64 notifies the IC card reading to the participant management unit 56, in which the participant management unit 56 acquires the identification information of the user read by the IC card detection unit 64.

In step S104, the participant management unit 56 transmits the acquired identification information to the user information server 10 to request the service information to the user information server 10 for acquiring the service information.

In step S105, the participant management unit 56 acquires the service information associated with the user identified by the acquired identification information from the user information server 10.

As indicated as (1) in FIG. 22A, if the authentication token of the schedule service 42 (external service) is included in the service information acquired in step S105, the processing in steps S106 to S113 are performed as illustrated in FIG. 22A. On the other hand, if the authentication token of the schedule service 42 (external service) is not included in the service information acquired in step S105, the processing in steps S106 to S113 are skipped.

In step S106, the participant management unit 56 transmits the acquired service information to the conference schedule setting unit 50 and requests the conference schedule setting unit 50 to display the schedule selection screen 1000 (FIG. 15).

In step S107, the conference schedule setting unit 50 requests a schedule list to the schedule service 42 for acquiring the schedule list using the authentication token of the schedule service 42 (external service) included in the received service information.

In step S108, the conference schedule setting unit 50 acquires the schedule list of the user that has held or placed the IC card 630 over the IC card detection unit 64 in step S101.

In step S109, the conference schedule setting unit 50 displays, for example, the schedule selection screen 1000 (FIG. 15).

In step S110, the user selects a schedule on the schedule selection screen 1000 (FIG. 15).

In step S111, the conference schedule setting unit 50 requests the schedule information (e.g., conference schedule information) to the schedule service 42 using the authentication token of the schedule service 42 (external service) included in the service information received in step S106 and a schedule name of the schedule selected in step S110 for acquiring the schedule information (e.g., conference schedule information).

In step S112, the conference schedule setting unit 50 acquires the schedule information of the user that has held or placed the IC card 630 over the IC card detection unit 64 in step S101 from the schedule service 42.

Then, in step S113, the conference schedule setting unit 50 transmits the schedule information (e.g., schedule name) of the schedule selected from the schedule selection screen 1000 (FIG. 15) by the user in step S110 and the identifier (identification information) of the apparatus (i.e., IP address of the electronic information board apparatus 14) to the apparatus management unit 30 of the apparatus management server 11 to update the apparatus management information (FIG. 11).

As indicated as (2) in FIG. 22B, if the authentication token of the file service 44 (external service) is included in the service information acquired in step S105 (FIG. 22A), the processing in steps S114 to S126 are performed as illustrated in FIG. 22B. On the other hand, if the authentication token of the file service 44 (external service) is not included in the service information acquired in step S105 (FIG. 22A), the processing in steps S114 to S126 are skipped.

In step S114, the participant management unit 56 transmits the acquired service information to the file reading unit 52 to request the file reading unit 52 to display the file selection screen 1100 (FIG. 16).

In step S115, the file reading unit 52 requests a folder/file list to the file service 44 for acquiring the folder/file list using the authentication token of the file service 44 (external service) included in the received service information.

In step S116, the file reading unit 52 acquires the folder/file list of the user from the file service 44.

In step S117, the file reading unit 52 displays the file selection screen 1100 (FIG. 16).

In step S118, the user selects a file on the file selection screen 1100 (FIG. 16).

In step S119, the file reading unit 52 requests the selected file to the file service 44 using the authentication token of the file service 44 (external service) included in the received service information, and a folder path and a file name of the file selected in step S118 for acquiring the selected file.

In step S120, the file reading unit 52 acquires, from the file service 44, the file selected by the user that has held or placed the IC card 630 over the IC card detection unit 64 in step S101.

In step S121, the file reading unit 52 instructs the board display unit 58 to display the acquired file.

In step S122, the file reading unit 52 transmits the file name of the file selected from the file selection screen 1100 (FIG. 16) by the user and the identifier (identification information) of the apparatus (i.e., IP address of the electronic information board apparatus 14) to the apparatus management unit 30 of the apparatus management server 11 to update the apparatus management information (FIG. 11).

In step S123, the file reading unit 52 notifies the folder/file list acquired in step S116 to the file transmission unit 54.

In step S124, the file transmission unit 54 displays, for example, the storage folder selection screen 1200 (FIG. 17).

In step S125, the user selects a storage folder name on the storage folder selection screen 1200 (FIG. 17).

In step S126, the file transmission unit 54 transmits the storage folder name of the storage folder selected from the storage folder selection screen 1200 (FIG. 17) by the user and the identifier (identification information) of the apparatus (i.e., IP address of the electronic information board apparatus 14) to the apparatus management unit 30 of the apparatus management server 11 to update the apparatus management information (FIG. 11).

As indicated as (3) in FIG. 22C, if the authentication token of the shared site service 46 (external service) is included in the service information acquired in step S105 (FIG. 22A), the processing in steps S127 to S139 are performed as illustrated in FIG. 22C. On the other hand, if the authentication token of the shared site service 46 (external service) is not included in the service information acquired in step S105 (FIG. 22A), the processing in steps S127 to S139 are skipped.

In step S127, the participant management unit 56 transmits the acquired service information to the shared site reading unit 55 to request the shared site reading unit 55 to display the shared site selection screen 1300 (FIG. 18).

In step S128, the shared site reading unit 55 requests a shared site list to the shared site service 46 using the authentication token of the shared site service 46 (external service) included in the received service information for acquiring the shared site list.

In step S129, the shared site reading unit 55 acquires the shared site list useable for the user from the shared site service 46.

In step S129-1, the shared site reading unit 55 displays the shared site selection screen 1300 (FIG. 18).

In step S130, the user selects a shared site on the shared site selection screen 1300 (FIG. 18).

In step S131, the shared site reading unit 55 transmits a shared site name of the shared site selected from the shared site selection screen 1300 by the user and the identifier (identification information) of the apparatus (i.e., IP address of the electronic information board apparatus 14) to the apparatus management unit 30 of the apparatus management server 11 to update the apparatus management information (FIG. 11).

In step S132, the shared site reading unit 55 requests a folder/file list to the shared site service 46 using the authentication token of the shared site service 46 (external service) included in the received service information for acquiring the folder/file list.

In step S133, the shared site reading unit 55 acquires the folder/file list of the user from the shared site service 46.

In step S134, the shared site reading unit 55 displays the file selection screen 1100 (FIG. 16).

In step S135, the user selects a file on the file selection screen 1100 (FIG. 16).

In step S136, the shared site reading unit 55 requests the shared site service 46 to retrieve or acquire the file using the authentication token of the shared site service 46 (external service) included in the received service information and a folder path and a file name of the file selected in step S135.

In step S137, the shared site reading unit 55 acquires, from the shared site service 46, the file selected by the user that has held or placed the IC card 630 over the IC card detection unit 64 in step S101.

In step S138, the shared site reading unit 55 instructs the board display unit 58 to display the acquired file.

In step S139, the shared site reading unit 55 transmits the file name of the file selected from the file selection screen 1100 (FIG. 16) by the user and the identifier (identification information) of the apparatus (i.e., IP address of the electronic information board apparatus 14) to the apparatus management unit 30 of the apparatus management server 11 to update the apparatus management information (FIG. 11).

In step S140, the file reading unit 52 requests the apparatus management information to the apparatus management unit 30 of the apparatus management server 11 to acquire the apparatus management information.

In step S141, the file reading unit 52 acquires the apparatus management information (FIG. 11) from the apparatus management unit 30.

In step S142, the file reading unit 52 notifies the acquired apparatus management information to the remote connection unit 60.

Then, the remote connection unit 60 of one electronic information board apparatus 14 compares the apparatus management information of one electronic information board apparatus 14 (first electronic information board apparatus, first apparatus) stored in the external resource and the apparatus management information of another electronic information board apparatus 14 (second electronic information board apparatus, second apparatus) stored in the external resource to determine whether there is any another electronic information board apparatus 14 having at least one piece of the apparatus management information (resource information) that matches any one piece of the apparatus management information (resource information) of the one electronic information board apparatus 14.

As indicated as (4) in FIG. 22D, if there is any another electronic information board apparatus 14 having at least one piece of the apparatus management information (resource information) that matches any one piece of the apparatus management information (resource information) of the one electronic information board apparatus 14, the processing in steps S143 and S144 are performed as illustrated in FIG. 22D.

In step S143, the remote connection unit 60 displays the connection destination recommendation screen 1400 (FIG. 19).

In step S144, the remote connection unit 60 receives a pressing of the OK button or the cancel button by the user on the connection destination recommendation screen 1400 being displayed.

On the other hand, as indicated as (5) in FIG. 22D, if there is no another electronic information board apparatus 14 having at least one piece of the apparatus management information (resource information) that matches any one piece of the apparatus management information (resource information) of the one electronic information board apparatus 14 or if the cancel button is pressed in step S144, the board display unit 58 performs the processing in steps S145 and S146 as illustrated in FIG. 22D.

In step S145, the remote connection unit 60 displays the connection destination selection screen 1600 (FIG. 21).

In step S146, the remote connection unit 60 receives a selection of the remote connection destination on the connection destination selection screen 1600 being displayed.

In step S147, the remote connection unit 60 starts or initiates the remote information sharing with the remote connection destination selected from the remote connection destination presented and recommended in the connection destination recommendation screen 1400 (FIG. 19) or from the connection destination selection screen 1600 (FIG. 21), by the user. After starting or initiating the remote information sharing, a plurality of electronic information board apparatuses 14, being engaged in the remote information sharing, perform, for example, the processing in steps S148 to S155 as illustrated in FIG. 22D.

In step S148, the board display unit 58 receives a manual writing operation by the user using, for example, the electronic pen or the hand of the user.

In step S149, the file transmission unit 54 receives a request for saving the board content from the user.

In step S150, the file transmission unit 54 requests the board content to the board display unit 58 for acquiring the board content.

In step S151, the file transmission unit 54 acquires a file of the board content from the board display unit 58.

Then, in step S152, the file transmission unit 54 requests the file service 44 to save the file of the board content into the storage folder selected in step S125 so that the file of the board content is saved in the storage folder of the file service 44.

If the user terminates the conference in step S153, the participant management unit 56 requests the apparatus management unit 30 of the apparatus management server 11 to reset the apparatus management information in step S154 to reset the apparatus management information of the electronic information board apparatus 14.

In step S155, the participant management unit 56 instructs the board display unit 58 to discard the displayed content.

As to the above described information processing system 1 of the embodiment, when one electronic information board apparatus 14 (first apparatus) performs the remote information sharing with another electronic information board apparatus 14 (second apparatus), the recommendable remote connection destination for the remote information sharing can be presented to the user, with which the user's workload for selecting the remote connection destination can be reduced.

When electronic information board apparatuses located at remote sites are to be connected using conventional methods, one electronic information board apparatus is required to set an internet protocol (IP) and identification (ID) information of another information processing apparatuses, such as another electronic information board apparatuses and personal computers (PCs), located at remote locations, which cannot be directly acquired at the one electronic information board apparatus, which is troublesome.

Therefore, as to the above described information processing system of the embodiment, when one information processing apparatus performs the remote information sharing with another information processing apparatus, the recommended connection destination can be presented to a user to reduce a user's workload for selecting another information processing apparatus located at the remote location.

Each of the embodiments described above is presented as an example, and it is not intended to limit the scope of the present disclosure. Numerous additional modifications and variations are possible in light of the above teachings. It is therefore to be understood that, within the scope of the appended claims, the disclosure of this specification can be practiced otherwise than as specifically described herein. Any one of the above-described operations may be performed in various other ways, for example, in an order different from the one described above. It should be noted that the information processing system 1 described in the above embodiment is just one example, and various configurations can be applied to the system depending on the applications and the purposes.

The conference schedule setting unit 50, the file reading unit 52 and the file transmission unit 54 are examples of an acquisition unit. The remote connection unit 60 is an example of a remote information sharing unit. The recommendable remote connection destination is an example of a recommended remote connection destination. The apparatus management unit 30 is an example of an apparatus management unit (apparatus control unit).

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

What is claimed is:

1. An information processing apparatus comprising:
    circuitry configured to
        acquire resource information including resources of an external service provided by an external service system;
        in response to a selection of a resource from the acquired resource information by the information processing apparatus, send an apparatus identifier of the information processing apparatus and a resource identifier of the resource selected by the information processing apparatus to a management apparatus different from the external service system to request the management apparatus to update apparatus management information including apparatus identifiers identifying the information processing apparatus and other information processing apparatuses and resource identifiers identifying the resources used by the information processing apparatus and the other information processing apparatuses;
        acquire the apparatus management information from the management apparatus;
        compare the resource identifier of the resource selected by the information processing apparatus with the resource identifiers that are in the acquired apparatus management information and used by the other information processing apparatuses to determine another information processing apparatus of the other information processing apparatuses using a same resource as the resource selected by the information processing apparatus; and
        perform a remote information sharing between the information processing apparatus and the determined another information processing apparatus using the resource selected by the information processing apparatus,
    wherein the circuitry is further configured to
        acquire the apparatus management information from the management apparatus before the information processing apparatus establishes a remote connection with the other information processing apparatuses;
        determine one or more other information processing apparatuses selecting the same resource as the resource selected by the information processing apparatus based on the acquired apparatus management information;
        display a screen indicating the one or more other information processing apparatuses;
        receive a selection of an information processing apparatus from among the one or more other information processing apparatuses displayed on the screen;
        establish a remote connection with the selected information processing apparatus; and
        start the remote information sharing with the information processing apparatus with which the remote connection is established.

2. The information processing apparatus according to claim 1,
    wherein the circuitry automatically starts the remote information sharing with the determined another information processing apparatus.

3. The information processing apparatus according to claim 1,
    wherein the circuitry presents and recommends to a user the determined another information processing apparatus as a remotely-located connectable apparatus located at a location remote from a location of the information processing apparatus, and receives an instruction to perform the remote information sharing with the determined another information processing apparatus from the user.

4. The information processing apparatus according to claim 3,
    wherein the circuitry displays, on a screen presenting and recommending the remotely-located connectable apparatus to the user, the resource selected at each of the information processing apparatus and the determined another information processing apparatus.

5. The information processing apparatus according to claim 1,
    wherein the circuitry acquires the resource information from an external service that provides the resource information to the information processing apparatus via a network.

6. The information processing apparatus according to claim 1,
    wherein the resource information includes schedule information controlled by the external service.

7. The information processing apparatus according to claim 1,
    wherein the resource information includes at least any one of information on a to-be-read file and information on a storage destination where a file is to be stored.

8. An information processing system, comprising:
    a plurality of information processing apparatuses each respectively located at each remote location; and
    a management apparatus that is different from an external service system providing an external service and stores apparatus management information including apparatus identifiers identifying the information processing apparatuses and resource identifiers identifying resources of the external service used by the information processing apparatuses,
    wherein each of the information processing apparatuses includes circuitry configured to
        acquire resource information including the resources of the external service provided by the external service system;
        in response to a selection of a resource from the acquired resource information by a first information processing apparatus of the information processing apparatuses, send an apparatus identifier of the first information processing apparatus and a resource identifier of the resource selected by the first information processing apparatus to the management apparatus to request the management apparatus to update the apparatus management information;
        acquire the apparatus management information from the management apparatus;
        compare the resource identifier of the resource selected by the first information processing apparatus with the resource identifiers that are in the acquired apparatus management information and used by other information processing apparatuses to determine a second information processing apparatus of the information processing apparatuses using a same resource as the resource selected by the first information processing apparatus; and perform a remote information sharing between the first information processing apparatus and the determined second information processing apparatus using the resource selected by the first information processing apparatus; and wherein the circuitry is further configured to acquire the apparatus management information from the management apparatus before the first information processing apparatus establishes a remote connection with the other information processing apparatuses;

determine one or more other information processing apparatuses selecting the same resource as the resource selected by the first information processing apparatus based on the acquired apparatus management information;

display a screen indicating the one or more other information processing apparatuses;

receive a selection of an information processing apparatus from among the one or more other information processing apparatuses displayed on the screen;

establish a remote connection with the selected information processing apparatus; and start the remote information sharing with the selected information processing apparatus with which the remote connection is established.

9. A method of sharing information between a plurality of information processing apparatuses each respectively located at each remote location, the method comprising:

acquiring resource information including resources of an external service provided by an external service system;

in response to a selection of a resource from the acquired resource information by a first information processing apparatus of the information processing apparatuses, sending an apparatus identifier of the first information processing apparatus and a resource identifier of the resource selected by the first information processing apparatus to a management apparatus different from the external service system to request the management apparatus to update apparatus management information including apparatus identifiers identifying the first information processing apparatus and other information processing apparatuses and resource identifiers identifying the resources used by the first information processing apparatus and the other information processing apparatuses;

acquiring the apparatus management information from the management apparatus;

comparing the resource identifier of the resource selected by the first information processing apparatus with the resource identifiers that are in the acquired apparatus management information and used by the other information processing apparatuses to determine a second information processing apparatus of the information processing apparatuses using a same resource as the resource selected by the first information processing apparatus; and performing a remote information sharing between the first information processing apparatus and the determined second information processing apparatus using the resource selected by the first information processing apparatus, wherein the method further comprises:

acquiring the apparatus management information from the management apparatus before the first information processing apparatus establishes a remote connection with the other information processing apparatuses;

determining one or more other information processing apparatuses selecting the same resource as the resource selected by the first information processing apparatus based on the acquired apparatus management information;

displaying a screen indicating the one or more other information processing apparatuses;

receiving a selection of an information processing apparatus from among the one or more other information processing apparatuses displayed on the screen;

establishing a remote connection with the selected information processing apparatus; and starting the remote information sharing with the selected information processing apparatus with which the remote connection is established.

* * * * *